United States Patent
Thantry et al.

(10) Patent No.: US 9,542,186 B2
(45) Date of Patent: *Jan. 10, 2017

(54) INSTRUCTION SET FOR SUPPORTING WIDE SCALAR PATTERN MATCHES

(71) Applicant: Intel Corporation, Santa Clara, CA (US)

(72) Inventors: Hariharan L. Thantry, Santa Clara, CA (US); Mani Azimi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,432

(22) Filed: Oct. 6, 2015

(65) Prior Publication Data

US 2016/0026466 A1    Jan. 28, 2016

Related U.S. Application Data

(63) Continuation of application No. 13/718,816, filed on Dec. 18, 2012, now Pat. No. 9,152,419.

(51) Int. Cl.
*G06F 9/00* (2006.01)
*G06F 9/30* (2006.01)

(52) U.S. Cl.
CPC ........ *G06F 9/30145* (2013.01); *G06F 9/30018* (2013.01); *G06F 9/30021* (2013.01); *G06F 9/30032* (2013.01); *G06F 9/30036* (2013.01)

(58) Field of Classification Search
CPC .......................... G06F 9/30145; G06F 9/30032
See application file for complete search history.

(56) References Cited

U.S. PATENT DOCUMENTS

| | | | |
|---|---|---|---|
| 6,529,554 B1 * | 3/2003 | Craver | H04N 19/176 348/423.1 |
| 2003/0041229 A1 * | 2/2003 | Sandbote | G06F 9/30032 712/223 |

OTHER PUBLICATIONS

Antonatos S., et al., "Generating Realistic Workloads for Network Intrusion Detection Systems," Proceedings of the 4th ACM Workshop on Software and Performance, Jan. 2004, 9 pages.
Cabrera, J.B.D., et al., "On the statistical distribution of processing times in network intrusion detection," 43rd IEEE conference on Decision and Control, pp. 75-80, Dec. 2004.

* cited by examiner

*Primary Examiner* — Zachary K Huson
(74) *Attorney, Agent, or Firm* — Nicholson De Vos Webster & Elliott LLP

(57) ABSTRACT

A processor includes an instruction decoder to receive an instruction having a first operand, a second operand, and a third operand, and an execution unit coupled to the instruction decoder to execute the instruction, the execution unit to individually perform a shift operation by at least one bit for each of a plurality of data elements stored in a storage location indicated by the second operand, for each of the data elements that has an overflow in response to the shift-left operation, to carry over the overflow into an adjacent data element based on a first bitmask obtained from the third operand, generating a final result, and to store the final result in a storage location indicated by the first operand.

18 Claims, 21 Drawing Sheets

```
__m512i vpsllq(__m512i in_vec, __mmask16 kmask, __u16 o_mask)
{
    __mmask16 overflow_mask;
    __u32 overflow_val;
    __u32 kval;
    /* To rotate the MSB bit that will overflow during left shift
     * back into the LSB position of the vector+1 entry
     */
    overflow_mask = _mm512_mask_test_epi32_mask(kmask, in_vec, msb_vec);
    /* Now shift the main vector by 1, based on kmask*/
    in_vec = _mm512_mask_slli_epi32(in_vec, kmask, in_vec, 1);

overflow_val = _mm512_mask2int(overflow_mask);
    kval = _mm512_int2mask(kmask);
    overflow_val <<= 1;
    overflow_val &=(kval & o_mask);

/* And, reload it back */
    overflow_mask = _mm512_int2mask(overflow_val);

/* Now fill in the LSB for vec+1 place */
    in_vec = _mm512_mask_or_epi32(in_vec, overflow_mask, lsb_vec, in_vec);
    return in_vec;
}
```

FIG. 6A

```
__m512i vpsrlqq(__m512i in_vec, __mmask16 kmask, __u16 o_mask)
{
    __mmask16 underflow_mask;
    __u32 underflow_val;
    __u32 kval;

/* To rotate the LSB bit that will underflow during right shift
     * into the MSB position of the vector-1 entry
     */
    underflow_mask = _mm512_mask_test_epi32_mask(kmask, in_vec, lsb_vec);
    /* Now shift the main vector by 1, based on kmask*/
    in_vec = _mm512_mask_srli_epi32(in_vec, kmask, in_vec, 1);

underflow_val = _mm512_mask2int(underflow_mask);
    kval = _mm512_int2mask(kmask);
    underflow_val >>= 1;
    underflow_val &=(kval & o_mask);

/* And, reload it back */
    underflow_mask = _mm512_int2mask(underflow_val);

/* Now fill in the MSB for vec-1 place */
    in_vec = _mm512_mask_or_epi32(in_vec, underflow_mask, msb_vec, in_vec);

return in_vec;
}
```

FIG. 6B

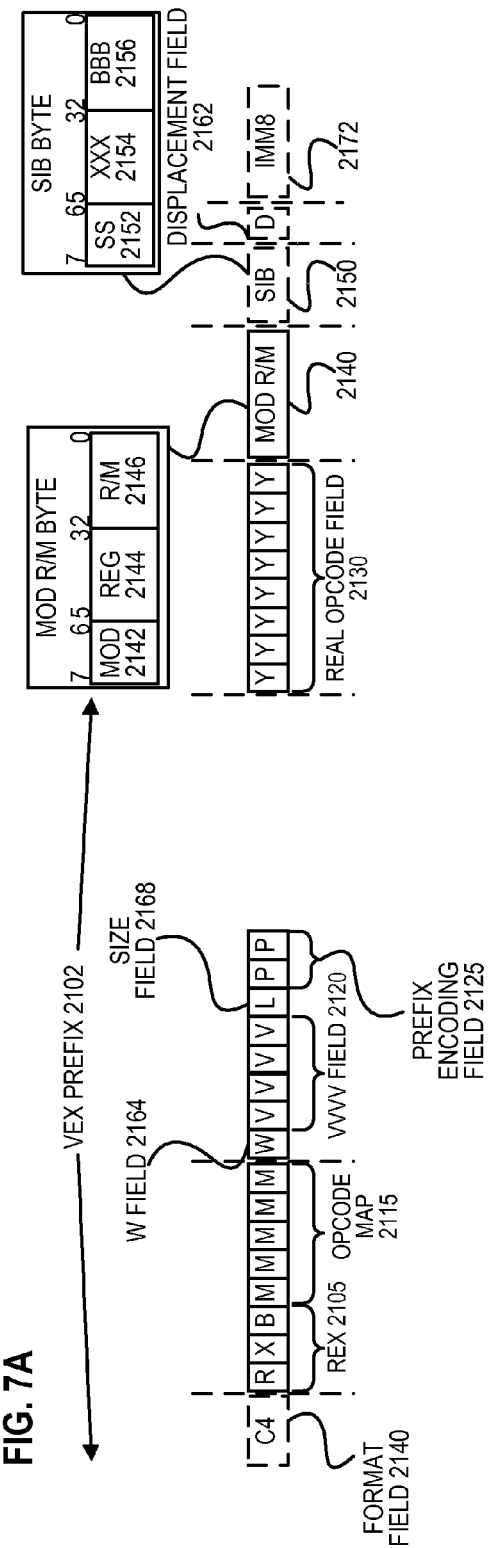
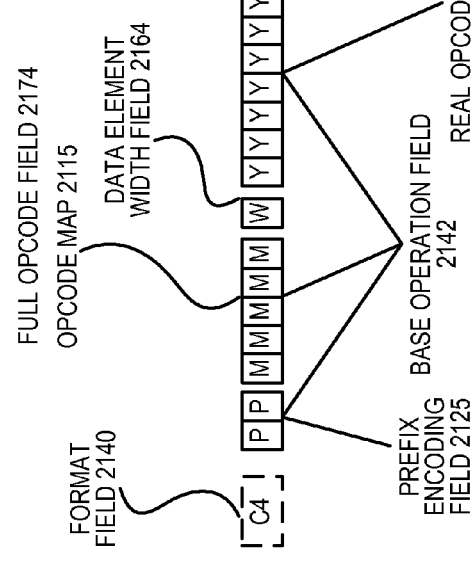

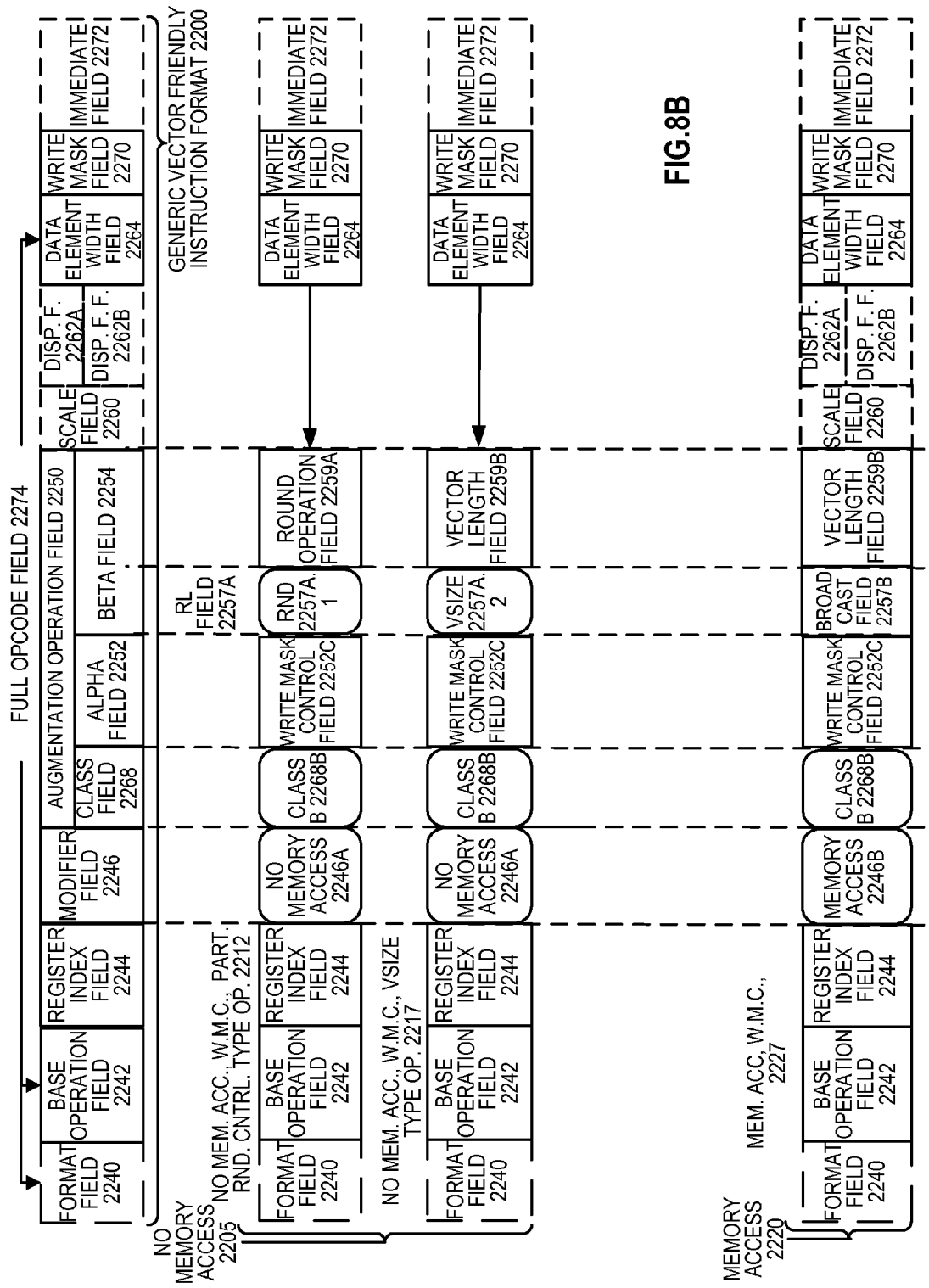

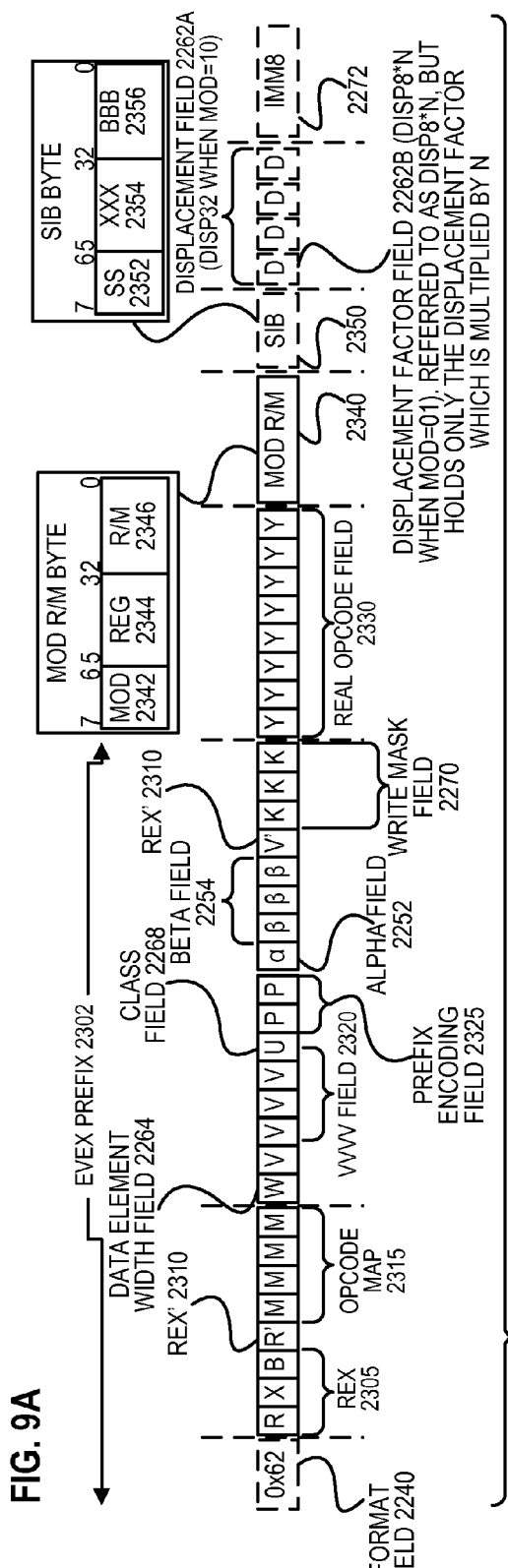

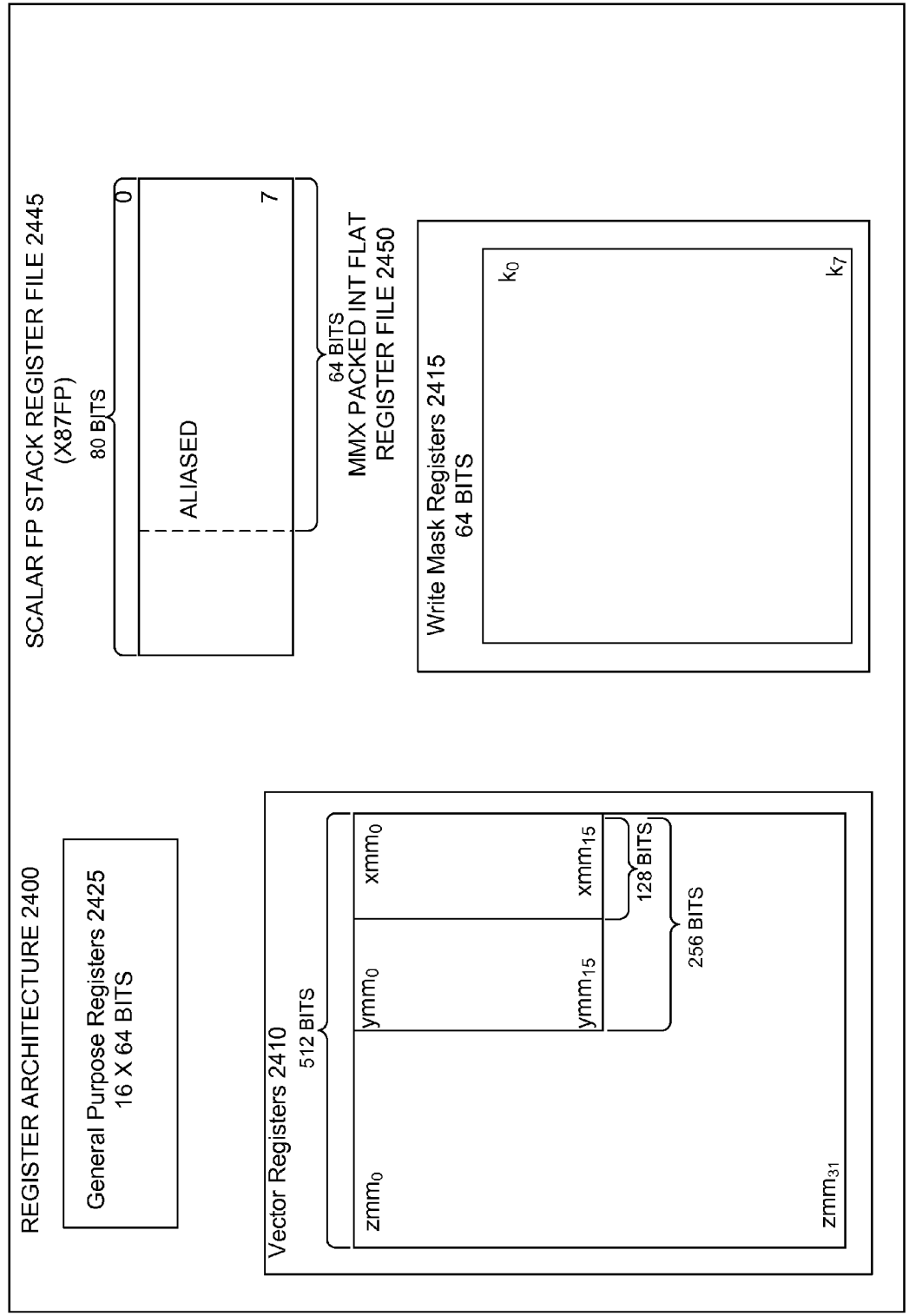

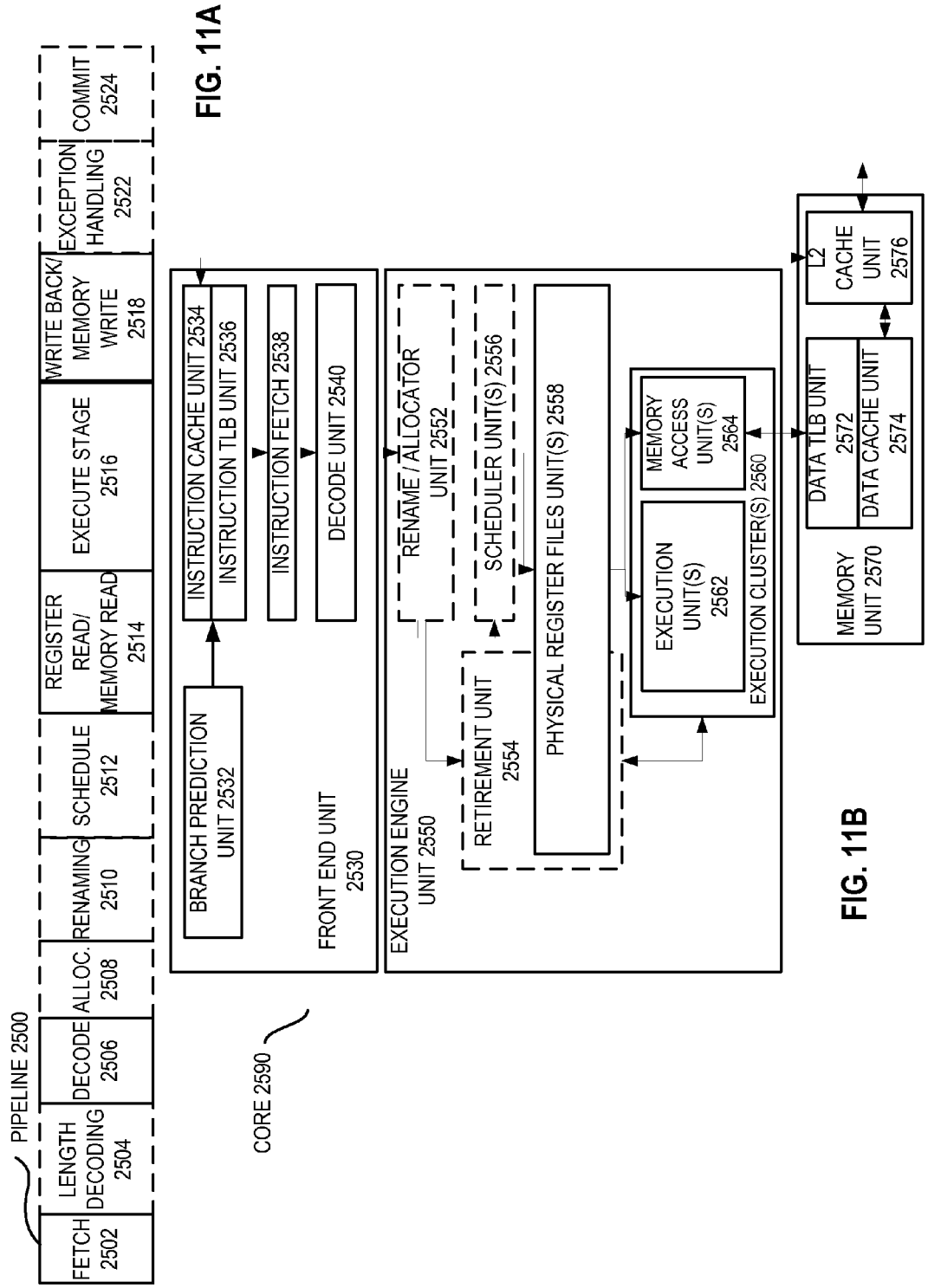

INSTRUCTION SET FOR SUPPORTING WIDE SCALAR PATTERN MATCHES

CLAIM TO PRIORITY

This patent application is a continuation of U.S. patent application Ser. No. 13/718,816, entitled "Instruction Set for Supporting Wide Scalar Pattern Matches" filed on Dec. 18, 2012.

TECHNICAL FIELD

Embodiments of the present invention relate generally to microprocessors. More particularly, embodiments of the invention relate to an instruction set for supporting wide scalar pattern matches.

BACKGROUND ART

String (pattern) match algorithms are widely used in the areas of network intrusion detection, business analytics, extensible markup language (XML) processing, search engines, and in the frontend for compilers and interpreters. These algorithms constitute large fractions of the total processing times for representative benchmarks in the areas of network intrusion detection (around 75%) and business analytics (around 50%). Bit-parallel string match algorithms are some of the most compute and storage efficient algorithms for pattern matching.

One of the most popular pattern matching algorithms is the backward non-deterministic (BNDM) algorithm. BNDM is a bit-parallel pattern match algorithm that basically simulates a backward NFA traversal within a shift window beginning from the back of the pattern, for all transitions of the character being examined. Since, it does a backward NFA traversal (suffix) within the shift window, this algorithm terminates earlier than a prefix approach, that simulates a forward NFA traversal, which would have to examine every character in the text. The NFA traversal is simulated using bit-masks per-character, and since the bit-masks per character are operated on in parallel if they fit within a computer register, this class of algorithms is called "bit-parallel" string match.

All the bit-parallel pattern match algorithms are divided into two stages. In the first stage (offline), a set of bit-masks are constructed from the pattern to be searched for, and in the second stage (online), these bitmasks are used for performing searches on an arbitrarily long length text. The basic classification of bit-parallel algorithms are in terms of where the search is begun (prefix or suffix), and the amount of window that is shifted (pure suffix or factor). For the purposes of this description, we assume that the length of the pattern being searched for does not exceed the maximum scalar width of the processor (i.e. processor word, currently 64), but this is not an inherent limitation of the algorithm itself. Larger lengths than 64 can be simulated using a byte-array per-character. For example, a 512 character pattern match can be simulated by having a 64-byte array per character that holds the bitmask for the character.

In a conventional system, these algorithms use byte arrays in memory when the length exceeds the scalar register width. Currently, there is no hardware that can efficiently provide support for such an algorithm when the length exceeds the scalar register width.

BRIEF DESCRIPTION OF THE DRAWINGS

Embodiments of the invention are illustrated by way of example and not limitation in the figures of the accompanying drawings in which like references indicate similar elements.

FIGS. 6A and 6B are pseudocode representing operations of wide scalar pattern matching processes according to certain embodiments.

FIG. 7A illustrates an exemplary advanced vector extensions (AVX) instruction format according to one embodiment of the invention.

FIG. 7B illustrates an exemplary advanced vector extensions (AVX) instruction format according to another embodiment of the invention.

FIG. 7C illustrates an exemplary advanced vector extensions (AVX) instruction format according to another embodiment of the invention.

FIG. 8B is a block diagram illustrating the generic vector friendly instruction format and class B instruction templates thereof according to embodiments of the invention.

FIG. 9A is a block diagram illustrating an exemplary specific vector friendly instruction format according to one embodiment of the invention.

FIG. 9B is a block diagram illustrating a generic vector friendly instruction format according to another embodiment of the invention.

FIG. 9C is a block diagram illustrating a generic vector friendly instruction format according to another embodiment of the invention.

FIG. 10 is a block diagram of register architecture according to one embodiment of the invention.

FIG. 11A is a block diagram illustrating both an exemplary in-order pipeline and an exemplary register renaming, out-of-order issue/execution pipeline according to embodiments of the invention.

FIG. 11B is a block diagram illustrating both an exemplary embodiment of an in-order architecture core and an exemplary register renaming, out-of-order issue/execution architecture core to be included in a processor according to embodiments of the invention.

DESCRIPTION OF THE EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, the bit-parallel string match algorithms for matching patterns are implemented using single instruction multiple data (SIMD) (e.g., vector) hardware when the pattern length exceeds the scalar width of registers. Embodiments of the invention achieve bit-parallel pattern match where the pattern length is limited only by the SIMD width of the vector registers. An embodiment of the invention extends this class of algorithms to support larger length pattern matches in a bit-parallel fashion where the length of the pattern being matched is limited by the SIMD width of the hardware. The algorithms can be implemented via an extension of instruction set architecture (ISA).

Figure 1:
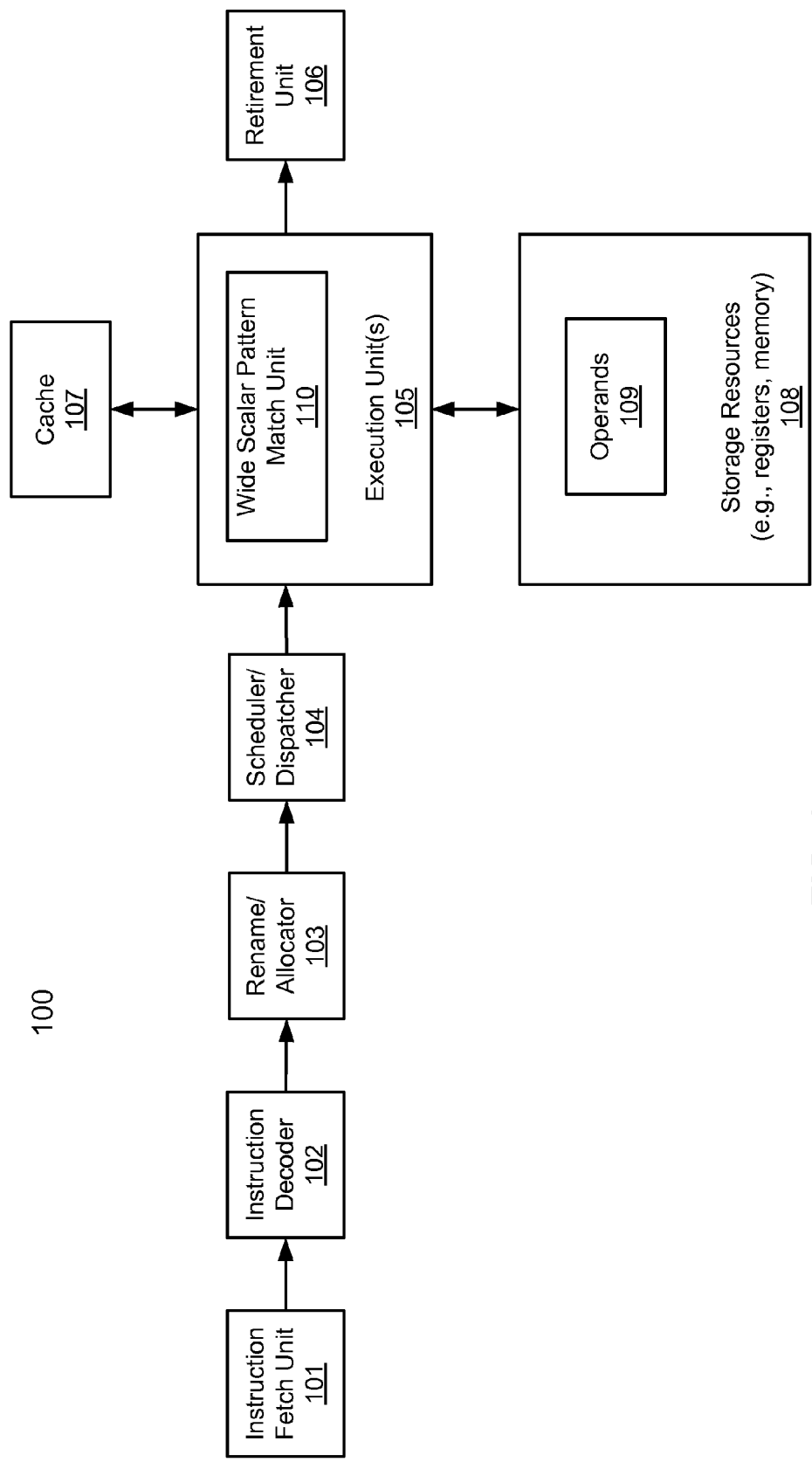
FIG. 1 is a block diagram of an execution pipeline of a processor or processor core according to one embodiment of the invention.

FIG. 1 is a block diagram of a processor or processor core according to one embodiment of the invention. Referring to FIG. 1, processor 100 may represent any kind of instruction processing apparatuses or processing elements. A processing element refers to a thread, a process, a context, a logical processor, a hardware thread, a core, and/or any processing element, which shares access to other shared resources of the processor, such as reservation units, execution units, pipelines, and higher level caches/memory. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. In one embodiment, processor 100 may be a general-purpose processor. Processor 100 may be any of various complex instruction set computing (CISC) processors, various reduced instruction set computing (RISC) processors, various very long instruction word (VLIW) processors, various hybrids thereof, or other types of processors entirely. Processor 100 may also represent one or more processor cores.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In one embodiment, processor 100 includes, but is not limited to, instruction fetch unit 101, instruction decoder 102, rename/allocator 103, scheduler/dispatcher 104, one or more execution units 105, and retirement unit 106, forming a processor pipeline. A pipeline or portion of a pipeline, such as a front-end or instruction decode portion 102 of the pipeline, can be shared by multiple threads. Architecture state registers (not shown) are replicated, so individual architecture states/contexts are capable of being stored for different logical processors. Other smaller resources, such as instruction pointers and renaming logic in rename allocator logic 103 may also be replicated for the threads. Some resources, such as re-order buffers in a reorder/retirement unit 106, load/store buffers, and queues may be shared through partitioning. While resources, such as general purpose internal registers (e.g., registers 108), page-table base registers, a low-level data-cache (e.g., cache 107) and data translation buffer (TLB), execution unit(s) 104, and an out-of-order unit (not shown) may be potentially fully shared.

In one embodiment, instruction decoder 102 is to decode the instructions received from instruction fetch unit 101. The instructions may be macroinstructions fetched from cache memory 107 that is integral within processor 100 or closely associated therewith, or may be retrieved from an external memory via a system bus. Instruction decoder 102 may decode the macroinstructions and generate or output one or more micro-operations, micro-code, entry points, microinstructions, other instructions, or other control signals, which reflect, or are derived from, the instructions. Instruction decoder 102 may be implemented using various different mechanisms. Examples of suitable mechanisms include, but are not limited to, microcode read only memories (ROMs), look-up tables, hardware implementations, programmable logic arrays (PLAs), and the like.

In one embodiment, allocator and rename unit 103 includes an allocator to reserve resources, such as register files to store instruction processing results. However, a thread is potentially capable of an out-of-order execution, where allocator and rename unit 103 also reserves other resources, such as reorder buffers to track instruction results. It may also include a register renamer to rename program/instruction reference registers to other registers internal to the processor. During such a renaming stage, references to external or logical registers are converted into internal or physical register references to eliminate dependencies caused by register reuse.

Scheduler and dispatch unit 104 is to schedule and dispatch instructions to execution units 105 for execution. In fact, instructions/operations are potentially scheduled on execution units 105 according to their type availability. For example, a floating point instruction is scheduled on a port of an execution unit that has an available floating point execution unit. Examples of execution units include a floating point execution unit, an integer execution unit, a jump execution unit, a load execution unit, a store execution unit, and other known execution units.

Execution units 105, which may include an arithmetic logic unit, or another type of logic unit capable of performing operations based on instructions. As a result of instruction decoder 102 decoding the instructions, execution unit 105 may receive one or more micro-operations, micro-code entry points, microinstructions, other instructions, or other control signals, which reflect, or are derived from, the instructions. Execution unit 105 may be operable as a result of instructions indicating one or more source operands (SRC) and to store a result in one or more destination operands (DEST) of a register set indicated by the instructions. Execution unit 105 may include circuitry or other execution logic (e.g., software combined with hardware and/or firmware) operable to execute instructions or other control signals derived from the instructions and perform an operation accordingly. Execution unit 105 may represent any kinds of execution units such as logic units, arithmetic logic units (ALUs), arithmetic units, integer units, etc.

In one embodiment, reorder/retirement unit 105 includes components, such as the reorder buffers mentioned above, load buffers, and store buffers, to support out-of-order execution and later in-order retirement of instructions executed out-of-order.

Some or all of the source and destination operands 109 may be stored in storage resources 108 such as registers of a register set or memory. A register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

In one embodiment, cache 107 includes a variety of cache such as a high level and/or low level cache. Higher-level or further-out cache is to cache recently fetched and/or operated on elements. Note that higher-level or further-out refers to cache levels increasing or getting further way from the execution unit(s). In one embodiment, the higher-level cache is a second-level data cache. However, the higher level cache is not so limited, as it may be or include an instruction cache, which may also be referred to as a trace cache. A trace cache may instead be coupled after a decoder to store recently decoded instructions. It also potentially includes a branch target buffer to predict branches to be executed or taken, and an instruction-translation buffer (I-TLB) to store address translation entries for instructions.

Lower level data cache and data translation buffer (D-TLB) may be coupled to an execution unit(s). The data cache is to store recently used/operated on elements, such as data operands, which are potentially held in memory coherency states, such as modified, exclusive, shared, and invalid (MESI) states. The D-TLB is to store recent virtual/linear to physical address translations. Previously, a D-TLB entry includes a virtual address, a physical address, and other information, such as an offset, to provide inexpensive translations for recently used virtual memory addresses.

Processor 100 further includes a bus interface unit (not shown). A bus interface unit is to communicate with devices external to a processor, such as system memory, a chipset, a northbridge, or other integrated circuit. The memory may be dedicated to the processor or shared with other devices in a system. Examples of the memory includes dynamic random access memory (DRAM), static RAM (SRAM), non-volatile memory (NV memory), and long-term storage. Typically the bus interface unit includes input/output (I/O) buffers to transmit and receive bus signals on an interconnect. Examples of the interconnect include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. The bus interface unit may also communicate with a higher level cache.

In one embodiment, the various stages described above can be organized into three phases. The first phase can be referred to as an in-order front end including the fetch stage 101, decode stage 102, allocate rename stage 103. During the in-order front end phase, the instructions proceed through the pipeline 100 in their original program order. The second phase can be referred to as the out-of-order execution phase including the schedule/dispatch stage 104 and the execute stage 105. During this phase, each instruction may be scheduled, dispatched and executed as soon as its data dependencies are resolved and the execution unit is available, regardless of its sequential position in the original program. The third phase, referred to as the in-order retirement phase which includes the retire stage 106 in which instructions are retired in their original, sequential program order to preserve the integrity and semantics of the program, and to provide a precise interrupt model.

In one embodiment, execution unit 105 includes a wide scalar pattern match unit 110, which may be implemented in a form of microcode. Pattern match unit 110 is to perform at least a portion of a wide scalar pattern match algorithm such as the BNDM algorithm described above. In one embodiment, pattern match unit 110 receives an instruction (e.g., SIMD instruction) having a first operand, a second operand, a third operand, and a fourth operand. In response to the instruction, pattern match unit 110 is to individually perform a shift operation of one or more bits on each of data elements retrieved from a storage location indicated by the third operand. Each of the data elements is associated with a particular vector lane. The shift operation can be a shift-left or shift-right operation dependent upon the instruction such as an opcode of the instruction.

In one embodiment, a shift operation is performed on a particular data element based on a first bitmask specified by the second operand. The first bitmask includes multiple bits and each bit corresponds to one of the data elements (e.g., vector lane). If a bit of the first bitmask has a predetermined bit value (e.g., logical one or TRUE), according to one embodiment, the corresponding data element is shifted by at least one bit; otherwise, the shift operation is not performed on the associated data element. In addition, according to one embodiment, for those data elements having an overflow due to the shift operation, the overflow may be carried over to an adjacent data element dependent upon bit values of a second bitmask specified by the fourth operand. The second bitmask includes multiple bits and each bit corresponds to one of the data elements (e.g., vector lane). If a bit of the second bitmask has a predetermined bit value (e.g., logical one or TRUE), an overflow of the corresponding data element is carried over to an adjacent data element.

For example, if the shift operation is a shift-left operation and if the corresponding bit of the second bitmask has a predetermined bit value, at least one most significant bit (MSB) of a first data element (e.g., a lower data element or lower vector lane) is carried over to at least one least significant bit (LSB) of an adjacent second data element (e.g., an upper data element or upper vector lane). Similarly, if the shift operation is a shift-right operation and if the corresponding bit of the second bitmask has a predetermined bit value, at least one LSB of a first data element (e.g., an upper data element or upper vector lane) is carried over to at least one MSB of an adjacent second data element (e.g., a lower data element or lower vector lane).

According to one embodiment, an instruction is defined as follows:

VPSLLQQ ZMM1, K1, ZMM2, K2

In this example, the opcode of VPSLLQQ indicates that the instruction is to perform a shift-left operation on the data elements obtained from the operands a first operand ZMM1, a second operand K1, a third operand ZMM2, and a fourth operand K2. In this example, 512-bit registers such as ZMM registers are utilized. A ZMM register, which has 512 bits, may provide 16 vector lanes, each having 32 bits. Other registers such as XMM (128-bit register) or YMM (256-bit register) registers may also be applied herein. In one embodiment, the first operand ZMM1 is a destination operand and the third operand ZMM2 is a source operand specifying a storage location storing multiple data elements (e.g., vector lanes). K1 and K2 specify a first bitmask for bit-shift operations and a second bitmask for overflow operations of the data elements, respectively. K1 and K2 each includes a number of bits (in this example, at least 16 bits) and each bit corresponds to one of the data elements specified by operands ZMM1 and ZMM2. Note that throughout this application, for the purpose of illustration, a shift operation is performed to shift one bit of a value indicated by the shift mask. However, the techniques described herein can also be applied to shifting more than one bit, for example, through an additional "count" extension in the ISA for specifying the number of bits to be shifted.

This instruction achieves a left shift by one of the value stored in ZMM2, under bitmask K1. Upon completion of this operation, the MSB of {lane−1} is shifted (overflowed) into the LSB of {lane}, based upon the bit settings for bitmask K2. If the bit position for a particular lane in K2 is not set, then the MSB bit for that lane is not overflowed. The "QQ" in the encoding for the instruction indicates that the vector register is treated as a wide scalar (quad-quad, or 512 bits) in this example. Other opcodes may be used to indicate other scalar widths. The result of this operation is stored in ZMM1. The operation is carried out based on the vector mask K1. Note that K1 prevents bit-shift operation from occurring on a lane, while K2 prevents the bit overflow. K2 operand allows the SIMD hardware to use one instruction to perform this operation for multiple patterns where the patterns are independent of each other and the length for each pattern exceeds the scalar width (32, in this case).

Figure 2:
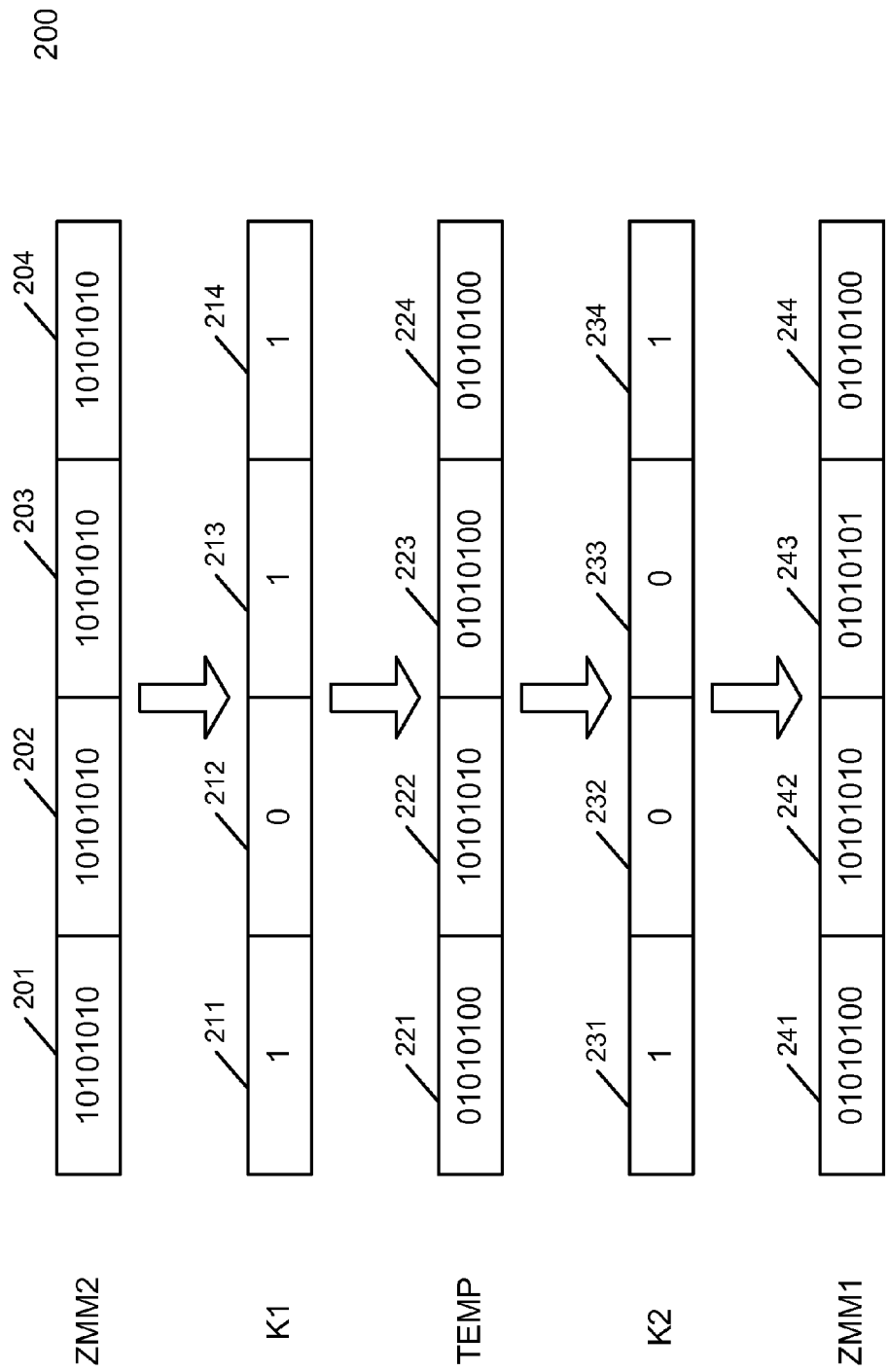
FIG. 2 is a diagram illustrating a process of a wide scalar pattern matching operation according to one embodiment.

FIG. 2 is a diagram illustrating a process of a wide scalar pattern matching operation according to one embodiment. Process 200 may be performed by processor 100 of FIG. 1 and represents operations of instruction VPSLLQQ according to one embodiment. Referring to FIG. 2, in this example, there are four data elements (4 vector lanes) and each data element has eight bits. However, more or fewer data elements or different sizes of the data elements may also be applied herein. In this example, source operand ZMM2 has four data elements 201-204, each having a binary value of "10101010." Bitmask K1 has four bits 211-214, each corresponding to data elements 201-204, where bit 211 has a logical value one; bit 212 has a logical value zero; bit 213 has a logical value one; and bit 214 has a logical value one.

In response to the instruction, based on bitmask K1, since bits 211 and 213-214 have logical value one, a shift-left operation, in this example shifting by one bit, is individually performed on data elements 201 and 203-204, generating intermediate results 221-224. Note that since bit 212 has a logical value zero, the shift-left operation is not performed on data element 202 and it remains the same as data element 222. As shown in FIG. 2, the shift-left operation causes overflows in data elements 201 and 203-204 since their MSB bits have a logical value one. The overflow may or may not be carried over dependent upon bitmask K2.

In this example, K2 has four bits, where bits 231 and 234 have logical value one, while bits 232 and 233 have a logical value zero. Thus, the overflows of data elements or vector lanes 221 and 224 will be carried over to an adjacent data element or vector lane. In particular, the MSB of data element 224 will be carried over to the LSB of data element 223. Since data element 221 is the most significant data element, the overflow will be ignored. The final result is shown in ZMM1 as the destination operand, where the LSB of data element 243 becomes one due to the overflows. In one embodiment, shift mask K1 supersedes overflow mask K2. That is, if a bit of shift mask K1 is not set, the corresponding data element remains unchanged, regardless the value of the corresponding bit in overflow mask K2.

Figure 3:
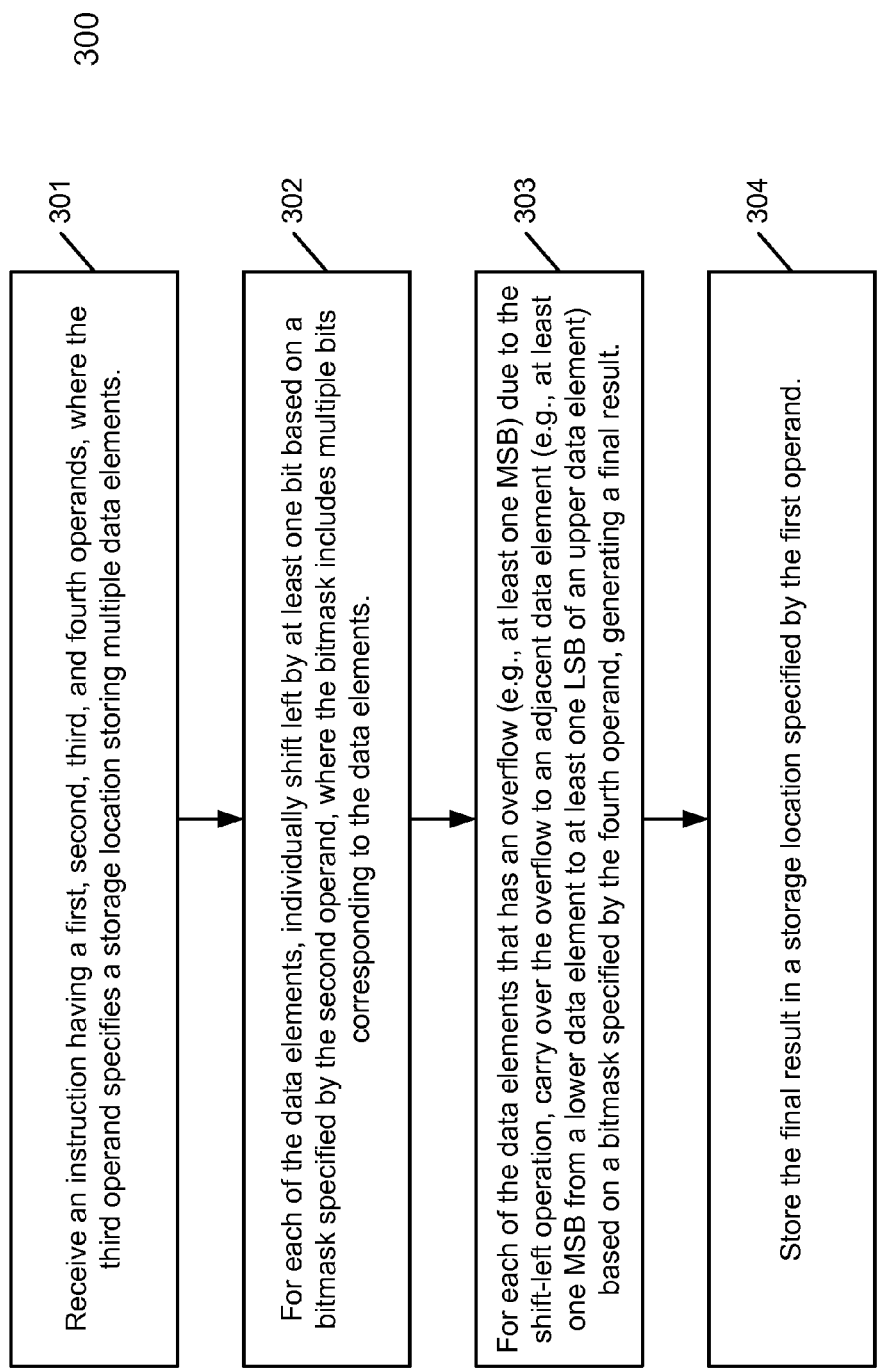
FIG. 3 is a flow diagram illustrating a method for a wide scalar pattern matching process according to one embodiment.

FIG. 3 is a flow diagram illustrating a method for a wide scalar pattern matching process according to one embodiment. Method 300 may be performed by processor 100 of FIG. 1. Referring to FIG. 3, at block 301, processing logic receives an instruction having a first, second, third, and fourth operands, where the third operand specifies a storage location storing multiple data elements in a vector fashion. Each of the data elements represents a vector lane. At block 302, a shift-left operation is individually performed on each of the data elements based on a first bitmask specified by the second operand. The first bitmask includes multiple bits each corresponding to one of the data elements. At block 303, for each of the data elements that have an overflow due to the shift-left operation, the overflow may be carried over to an adjacent data element based on a second bitmask specified by the fourth operand, generating a final result. A block 304, the final result is then stored in a storage location indicated by the first operand. FIG. 6A is pseudocode represents operations involved in process 300 of FIG. 3.

According to another embodiment, an instruction is defined as follows:

VPSRLQQ ZMM1, K1, ZMM2, K2

In this example, the opcode of VPSRLQQ indicates that the instruction is to perform a shift-right operation on the data elements obtained from the operands a first operand ZMM1, a second operand K1, a third operand ZMM2, and a fourth operand K2. In this example, 512-bit registers such as ZMM registers are utilized. A ZMM register, which has 512 bits, may provide 16 vector lanes, each having 32 bits. Other registers such as XMM (128-bit register) or YMM (256-bit register) registers may also be applied herein. In one embodiment, the first operand ZMM1 is a destination operand and the third operand ZMM2 is a source operand specifying a storage location storing multiple data elements (e.g., vector lanes). K1 and K2 specify a first bitmask for bit-shift operations and a second bitmask for overflow operations of the data elements, respectively. K1 and K2 each includes a number of bits (in this example, at least 16 bits) and each bit corresponds to one of the data elements specified by operands ZMM1 and ZMM2.

Instruction VPSRLQQ is similar to instruction VPSLLQQ above, and is useful for bit-parallel algorithms that rely on prefix match (i.e. matching the text starting from the beginning of the pattern). This instruction would perform a right shift by one of the value stored in ZMM2, under mask K1. The least significant bit (LSB) of {lane} is shifted (overflowed) into the MSB of {lane−1}, based upon the bit settings for K2. If the bit position for a particular lane in K2 is not set, then the LSB bit for that lane is not overflowed. The result of this operation is stored in ZMM1. The operation is carried out based on the vector mask K1. Note that K1 prevents bit-shift operation from occurring on a lane, while K2 prevents the bit overflow. K2 operand allows the hardware to use one instruction to perform this operation for multiple patterns where the pattern length for each pattern exceeds the scalar width (32, in this case).

Figure 4:
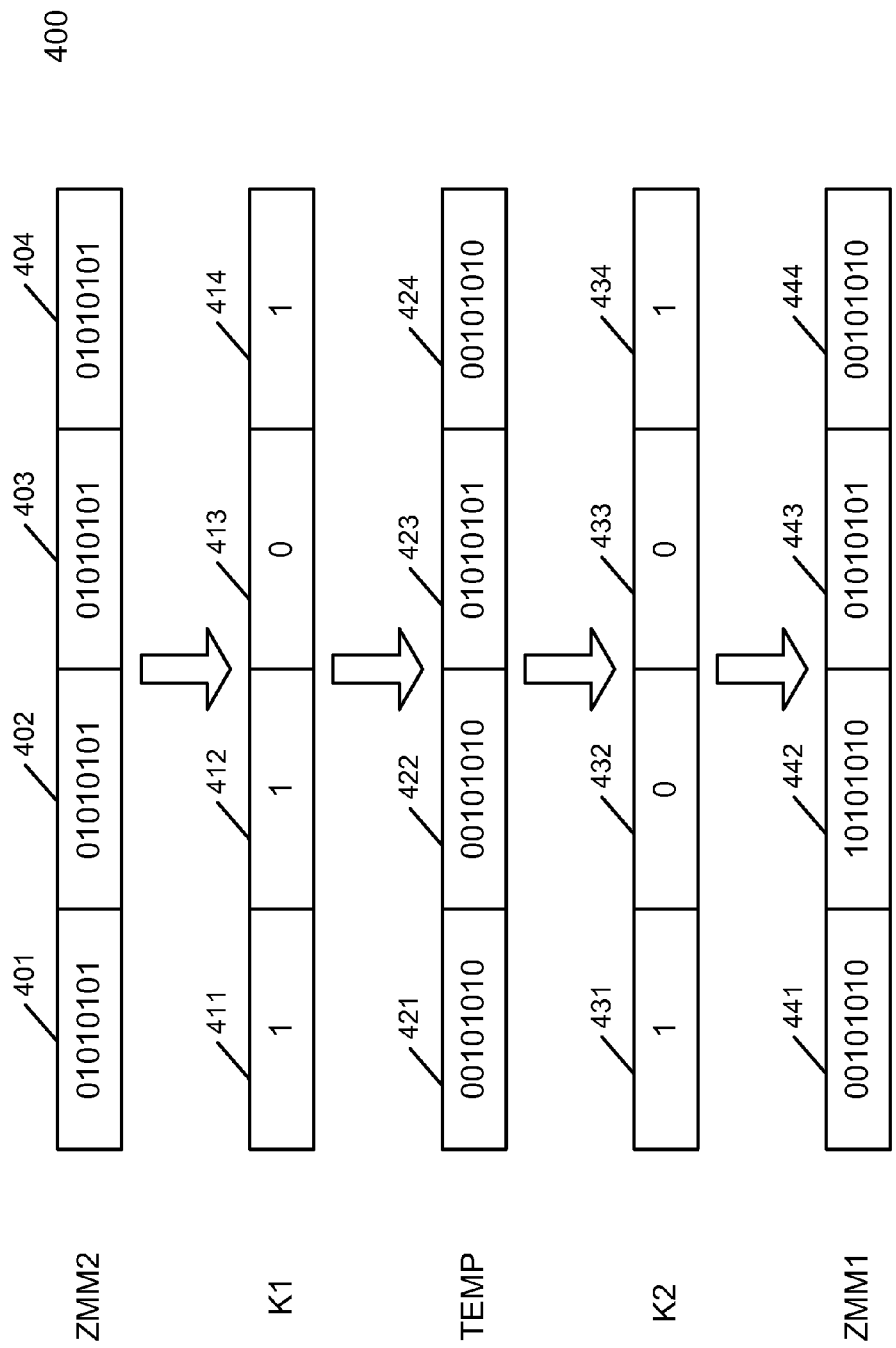
FIG. 4 is a diagram illustrating a process of a wide scalar pattern matching operation according to one embodiment.

FIG. 4 is a diagram illustrating a process of a wide scalar pattern matching operation according to one embodiment. Process 400 may be performed by processor 100 of FIG. 1 and represents operations of instruction VPSRLQQ according to one embodiment. Referring to FIG. 4, in this example, there are four data elements (4 vector lanes) and each data element has eight bits. However, more or fewer data elements or different sizes of the data elements may also be applied herein. In this example, source operand ZMM2 has four data elements 401-404, each having a binary value of "01010101." Bitmask K1 has at least four bits 411-414, each corresponding to data elements 401-404, where bit 411 has a logical value one; bit 412 has a logical value zero; bit 413 has a logical value one; and bit 414 has a logical value one.

In response to the instruction, based on bitmask K1, since bits 411 and 413-414 have logical value one, a shift-right operation is individually performed on data elements 401 and 403-404, generating intermediate results 421-424. Note that since bit 412 has a logical value zero, the shift-right operation is not performed on data element 402 and it remains the same as data element 422. As shown in FIG. 4, the shift-right operation causes overflows in data elements 401 and 403-404 since their LSB bits have a logical value one. The overflow may or may not be carried over dependent upon bitmask K2.

In this example, K2 has four bits, where bits 431 and 434 have logical value one, while bits 432 and 433 have a logical value zero. Thus, the overflows of data elements or vector lanes 421 and 424 will be carried over to an adjacent data element or vector lane. In particular, the LSB of data element 421 will be carried over to the MSB of data element 422. Since data element 424 is the least significant data element, the overflow will be ignored. The final result is shown in ZMM1 as the destination operand, where the MSB of data element 442 becomes one due to the overflows. In one embodiment, shift mask K1 supersedes overflow mask K2. That is, if a bit of shift mask K1 is not set, the corresponding data element remains unchanged, regardless the value of the corresponding bit in overflow mask K2.

Figure 5:
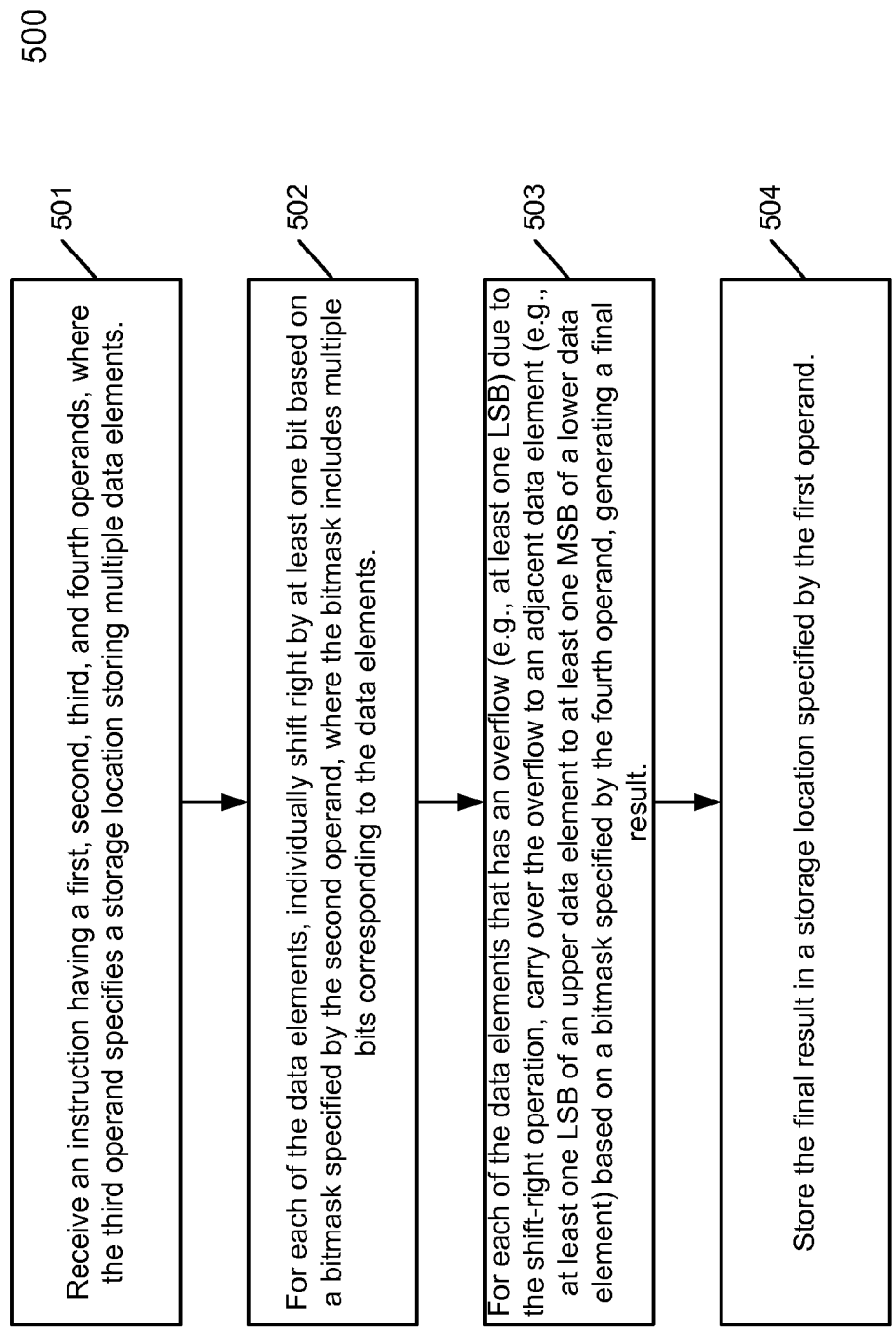
FIG. 5 is a flow diagram illustrating a method for a wide scalar pattern matching process according to one embodiment.

FIG. 5 is a flow diagram illustrating a method for a wide scalar pattern matching process according to one embodiment. Method 500 may be performed by processor 100 of FIG. 1. Referring to FIG. 5, at block 501, processing logic receives an instruction having a first, second, third, and fourth operands, where the third operand specifies a storage location storing multiple data elements in a vector fashion. Each of the data elements represents a vector lane. At block 502, a shift-right operation is individually performed on each of the data elements based on a first bitmask specified by the second operand. The first bitmask includes multiple bits each corresponding to one of the data elements. At block 503, for each of the data elements that have an overflow due to the shift-left operation, the overflow may be carried over to an adjacent data element based on a second bitmask specified by the fourth operand, generating a final result. A block 504, the final result is then stored in a storage location indicated by the first operand. FIG. 6B is pseudocode represents operations involved in process 500 of FIG. 5.

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the microarchitecture, which is the internal design of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as packed data type or vector data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands, that operate in a horizontal fashion, that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance. An additional set of SIMD extensions, referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 7A illustrates an exemplary AVX instruction format including a VEX prefix 2102, real opcode field 2130, Mod R/M byte 2140, SIB byte 2150, displacement field 2162, and IMM8 2172. FIG. 7B illustrates which fields from FIG. 7A make up a full opcode field 2174 and a base operation field 2142. FIG. 7C illustrates which fields from FIG. 7A make up a register index field 2144.

VEX Prefix (Bytes 0-2) 2102 is encoded in a three-byte form. The first byte is the Format Field 2140 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 2105 (VEX Byte 1, bits [7-5]) consists of a VEX.R bit field (VEX Byte 1, bit [7]–R), VEX.X bit field (VEX byte 1, bit [6]–X), and VEX.B bit field (VEX byte 1, bit[5]–B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 2115 (VEX byte 1, bits [4:0]–mmmmm) includes content to encode an implied leading opcode byte. W Field 2164 (VEX byte 2, bit [7]–W)—is represented by the notation VEX.W, and provides different functions depending on the instruction. The role of VEX.vvvv 2120 (VEX Byte 2, bits [6:3]–vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 2168 Size field (VEX byte 2, bit [2]–L)=0, it indicates 128 bit vector; if VEX.L=1, it indicates 256 bit vector. Prefix encoding field 2125 (VEX byte 2, bits [1:0]–pp) provides additional bits for the base operation field.

Real Opcode Field 2130 (Byte 3) is also known as the opcode byte. Part of the opcode is specified in this field. MOD R/M Field 2140 (Byte 4) includes MOD field 2142 (bits [7-6]), Reg field 2144 (bits [5-3]), and R/M field 2146 (bits [2-0]). The role of Reg field 2144 may include the following: encoding either the destination register operand or a source register operand (the rrr of Rrrr), or be treated as an opcode extension and not used to encode any instruction operand. The role of R/M field 2146 may include the following: encoding the instruction operand that references a memory address, or encoding either the destination register operand or a source register operand.

Scale, Index, Base (SIB)—The content of Scale field 2150 (Byte 5) includes SS2152 (bits [7-6]), which is used for memory address generation. The contents of SIB.xxx 2154 (bits [5-3]) and SIB.bbb 2156 (bits [2-0]) have been previously referred to with regard to the register indexes Xxxx and Bbbb. The Displacement Field 2162 and the immediate field (IMM8) 2172 contain address data.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
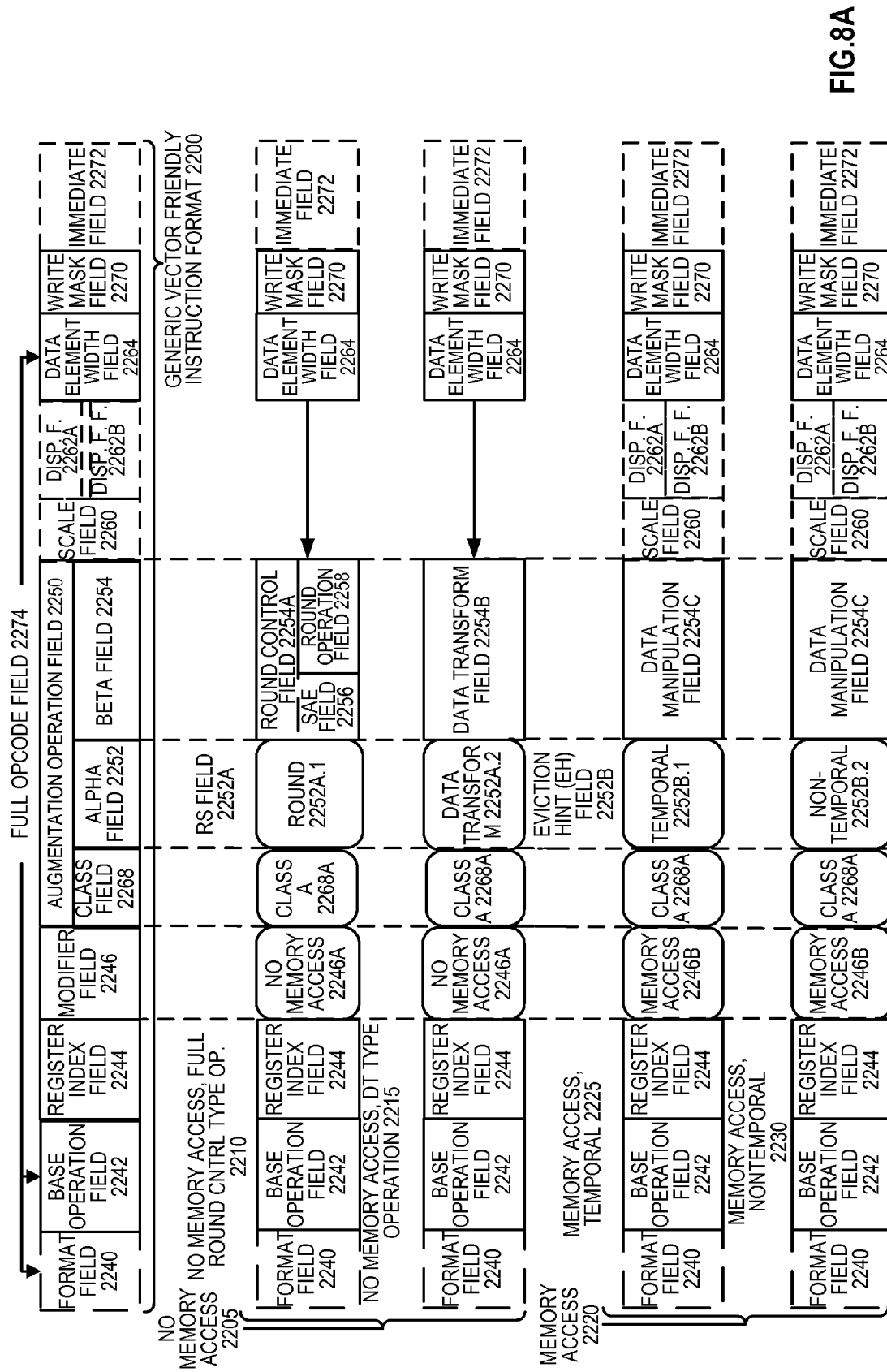
FIG. 8A is a block diagram illustrating a generic vector friendly instruction format and class A instruction templates thereof according to embodiments of the invention.

FIG. 8A, FIG. 8B, and FIG. 8C are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 2200 for which are defined class A and class B instruction templates, both of which include no memory access 2205 instruction templates and memory access 2220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 2205 instruction templates there is shown a no memory access, full round control type operation 2210 instruction template and a no memory access, data transform type operation 2215 instruction template; and 2) within the memory access 2220 instruction templates there is shown a memory access, temporal 2225 instruction template and a memory access, non-temporal 2230 instruction template. The class B instruction templates in FIG. 8B include: 1) within the no memory access 2205 instruction templates there is shown a no memory access, write mask control, partial round control type operation 2212 instruction template and a no memory access, write mask control, vsize type operation 2217 instruction template; and 2) within the memory access 2220 instruction templates there is shown a memory access, write mask control 2227 instruction template.

The generic vector friendly instruction format 2200 includes the following fields listed below in the order illustrated in FIG. 8A and FIG. 8B. Format field 2240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format. Base operation field 2242—its content distinguishes different base operations.

Register index field 2244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2246—its content distinguishes occurrences of instructions in the generic vector instruction format that specify memory access from those that do not; that is, between no memory access 2205 instruction templates and memory access 2220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2250—its content distinguishes which one of a variety of different operations to be performed in addition to the base operation. This field is context specific. In one embodiment of the invention, this field is divided into a class field 2268, an alpha field 2252, and a beta field 2254. The augmentation operation field 2250 allows common groups of operations to be performed in a single instruction rather than 2, 3, or 4 instructions. Scale field 2260—its content allows for the scaling of the index field's content for memory address generation (e.g., for address generation that uses $2^{scale}*\text{index}+\text{base}$).

Displacement Field 2262A—its content is used as part of memory address generation (e.g., for address generation that uses $2^{scale}*\text{index}+\text{base}+\text{displacement}$). Displacement Factor Field 2262B (note that the juxtaposition of displacement field 2262A directly over displacement factor field 2262B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2274 (described later herein) and the data manipulation field 2254C. The displacement field 2262A and the displacement factor field 2262B are optional in the sense that they are not used for the no memory access 2205 instruction templates and/or different embodiments may implement only one or none of the two.

Data element width field 2264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2270 allows for partial vector operations, including loads, stores, arithmetic, logical, etc. While embodiments of the invention are described in which the write mask field's 2270 content selects one of a number of write mask registers that contains the write mask to be used (and thus the write mask field's 2270 content indirectly identifies that masking to be performed), alternative embodiments instead or additional allow the mask write field's 2270 content to directly specify the masking to be performed.

Immediate field 2272—its content allows for the specification of an immediate. This field is optional in the sense that is it not present in an implementation of the generic vector friendly format that does not support immediate and it is not present in instructions that do not use an immediate. Class field 2268—its content distinguishes between different classes of instructions. With reference to FIG. 8A and FIG. 8B, the contents of this field select between class A and class B instructions. In FIG. 8A and FIG. 8B, rounded corner squares are used to indicate a specific value is present in a field (e.g., class A 2268A and class B 2268B for the class field 2268 respectively in FIG. 8A and FIG. 8B).

In the case of the non-memory access 2205 instruction templates of class A, the alpha field 2252 is interpreted as an RS field 2252A, whose content distinguishes which one of the different augmentation operation types are to be performed (e.g., round 2252A.1 and data transform 2252A.2 are respectively specified for the no memory access, round type operation 2210 and the no memory access, data transform type operation 2215 instruction templates), while the beta field 2254 distinguishes which of the operations of the specified type is to be performed. In the no memory access 2205 instruction templates, the scale field 2260, the displacement field 2262A, and the displacement scale filed 2262B are not present.

In the no memory access full round control type operation 2210 instruction template, the beta field 2254 is interpreted as a round control field 2254A, whose content(s) provide static rounding. While in the described embodiments of the invention the round control field 2254A includes a suppress all floating point exceptions (SAE) field 2256 and a round operation control field 2258, alternative embodiments may support may encode both these concepts into the same field or only have one or the other of these concepts/fields (e.g., may have only the round operation control field 2258).

SAE field 2256—its content distinguishes whether or not to disable the exception event reporting; when the SAE field's 2256 content indicates suppression is enabled, a given instruction does not report any kind of floating-point exception flag and does not raise any floating point exception handler.

Round operation control field 2258—its content distinguishes which one of a group of rounding operations to perform (e.g., Round-up, Round-down, Round-towards-zero and Round-to-nearest). Thus, the round operation control field 2258 allows for the changing of the rounding mode on a per instruction basis. In one embodiment of the invention where a processor includes a control register for specifying rounding modes, the round operation control field's 2250 content overrides that register value.

In the no memory access data transform type operation 2215 instruction template, the beta field 2254 is interpreted as a data transform field 2254B, whose content distinguishes which one of a number of data transforms is to be performed (e.g., no data transform, swizzle, broadcast).

In the case of a memory access 2220 instruction template of class A, the alpha field 2252 is interpreted as an eviction hint field 2252B, whose content distinguishes which one of the eviction hints is to be used (in FIG. 8A, temporal 2252B.1 and non-temporal 2252B.2 are respectively specified for the memory access, temporal 2225 instruction template and the memory access, non-temporal 2230 instruction template), while the beta field 2254 is interpreted as a data manipulation field 2254C, whose content distinguishes which one of a number of data manipulation operations (also known as primitives) is to be performed (e.g., no manipulation; broadcast; up conversion of a source; and down conversion of a destination). The memory access 2220 instruction templates include the scale field 2260, and optionally the displacement field 2262A or the displacement scale field 2262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Temporal data is data likely to be reused soon enough to benefit from caching. This is, however, a hint, and different processors may implement it in different ways, including ignoring the hint entirely. Non-temporal data is data unlikely to be reused soon enough to benefit from caching in the 1st-level cache and should be given priority for eviction. This is, however, a hint, and different processors may implement it in different ways, including ignoring the hint entirely.

In the case of the instruction templates of class B, the alpha field 2252 is interpreted as a write mask control (Z) field 2252C, whose content distinguishes whether the write masking controlled by the write mask field 2270 should be a merging or a zeroing.

In the case of the non-memory access 2205 instruction templates of class B, part of the beta field 2254 is interpreted as an RL field 2257A, whose content distinguishes which one of the different augmentation operation types are to be performed (e.g., round 2257A.1 and vector length (VSIZE) 2257A.2 are respectively specified for the no memory access, write mask control, partial round control type operation 2212 instruction template and the no memory access, write mask control, VSIZE type operation 2217 instruction template), while the rest of the beta field 2254 distinguishes which of the operations of the specified type is to be performed. In the no memory access 2205 instruction templates, the scale field 2260, the displacement field 2262A, and the displacement scale filed 2262B are not present.

In the no memory access, write mask control, partial round control type operation 2210 instruction template, the rest of the beta field 2254 is interpreted as a round operation field 2259A and exception event reporting is disabled (a given instruction does not report any kind of floating-point exception flag and does not raise any floating point exception handler).

Round operation control field 2259A—just as round operation control field 2258, its content distinguishes which one of a group of rounding operations to perform (e.g., Round-up, Round-down, Round-towards-zero and Round-to-nearest). Thus, the round operation control field 2259A allows for the changing of the rounding mode on a per instruction basis. In one embodiment of the invention where a processor includes a control register for specifying rounding modes, the round operation control field's 2250 content overrides that register value.

In the no memory access, write mask control, VSIZE type operation 2217 instruction template, the rest of the beta field 2254 is interpreted as a vector length field 2259B, whose content distinguishes which one of a number of data vector lengths is to be performed on (e.g., 128, 256, or 512 byte).

In the case of a memory access 2220 instruction template of class B, part of the beta field 2254 is interpreted as a broadcast field 2257B, whose content distinguishes whether or not the broadcast type data manipulation operation is to be performed, while the rest of the beta field 2254 is interpreted the vector length field 2259B. The memory access 2220 instruction templates include the scale field 2260, and optionally the displacement field 2262A or the displacement scale field 2262B.

With regard to the generic vector friendly instruction format 2200, a full opcode field 2274 is shown including the format field 2240, the base operation field 2242, and the data element width field 2264. While one embodiment is shown where the full opcode field 2274 includes all of these fields, the full opcode field 2274 includes less than all of these fields in embodiments that do not support all of them. The full opcode field 2274 provides the operation code (opcode).

The augmentation operation field 2250, the data element width field 2264, and the write mask field 2270 allow these features to be specified on a per instruction basis in the generic vector friendly instruction format. The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIG. 9 is a block diagram illustrating an exemplary specific vector friendly instruction format according to embodiments of the invention. FIG. 9 shows a specific vector friendly instruction format 2300 that is specific in the sense that it specifies the location, size, interpretation, and order of the fields, as well as values for some of those fields. The specific vector friendly instruction format 2300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the invention are described with reference to the specific vector friendly instruction format 2300 in the context of the generic vector friendly instruction format 2200 for illustrative purposes, the invention is not limited to the specific vector friendly instruction format 2300 except where claimed. For example, the generic vector friendly instruction format 2200 contemplates a variety of possible sizes for the various fields, while the specific vector friendly instruction format 2300 is shown as having fields of specific sizes. By way of specific example, while the data element width field 2264 is illustrated as a one bit field in the specific vector friendly instruction format 2300, the invention is not so limited (that is, the generic vector friendly instruction format 2200 contemplates other sizes of the data element width field 2264).

The generic vector friendly instruction format 2200 includes the following fields listed below in the order illustrated in FIG. 9A. EVEX Prefix (Bytes 0-3) 2302—is encoded in a four-byte form. Format Field 2240 (EVEX Byte 0, bits [7:0])—the first byte (EVEX Byte 0) is the format field 2240 and it contains 0x62 (the unique value used for distinguishing the vector friendly instruction format in one embodiment of the invention). The second-fourth bytes (EVEX Bytes 1-3) include a number of bit fields providing specific capability.

REX field 2305 (EVEX Byte 1, bits [7-5])—consists of a EVEX.R bit field (EVEX Byte 1, bit [7]–R), EVEX.X bit field (EVEX Byte 1, bit [6]–X), and 2257BEX byte 1, bit[5]–B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2210—this is the first part of the REX' field 2210 and is the EVEX.R' bit field (EVEX Byte 1, bit [4]–R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2315 (EVEX byte 1, bits [3:0]–mmmm)—its content encodes an implied leading opcode byte (0F, 0F 38, or 0F 3). Data element width field 2264 (EVEX byte 2, bit [7]–W)—is represented by the notation EVEX.W. EVEX.W is used to define the granularity (size) of the datatype (either 32-bit data elements or 64-bit data elements). EVEX.vvvv 2320 (EVEX Byte 2, bits [6:3]–vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 2320 encodes the 4 low-order bits of the first source register specifier stored in inverted (1s complement) form. Depending on the instruction, an extra different EVEX bit field is used to extend the specifier size to 32 registers. EVEX.U 2268 Class field (EVEX byte 2, bit [2]–U)—If EVEX.U=0, it indicates class A or EVEX.U0; if EVEX.U=1, it indicates class B or EVEX.U1.

Prefix encoding field 2325 (EVEX byte 2, bits [1:0]–pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2252 (EVEX byte 3, bit [7]–EH; also known as EVEX.EH, EVEX.rs, EVEX.RL, EVEX.write mask control, and EVEX.N; also illustrated with α)—as previously described, this field is context specific. Beta field 2254 (EVEX byte 3, bits [6:4]–SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 2210—this is the remainder of the REX' field and is the EVEX.V' bit field (EVEX Byte 3, bit [3]–V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2270 (EVEX byte 3, bits [2:0]–kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2330 (Byte 4) is also known as the opcode byte. Part of the opcode is specified in this field. MOD R/M Field 2340 (Byte 5) includes MOD field 2342, Reg field 2344, and R/M field 2346. As previously described, the MOD field's 2342 content distinguishes between memory access and non-memory access operations. The role of Reg field 2344 can be summarized to two situations: encoding either the destination register operand or a source register operand, or be treated as an opcode extension and not used to encode any instruction operand. The role of R/M field 2346 may include the following: encoding the instruction operand that references a memory address, or encoding either the destination register operand or a source register operand.

Scale, Index, Base (SIB) Byte (Byte 6)—As previously described, the scale field's 2250 content is used for memory address generation. SIB.xxx 2354 and SIB.bbb 2356—the contents of these fields have been previously referred to with regard to the register indexes Xxxx and Bbbb. Displacement field 2262A (Bytes 7-10)—when MOD field 2342 contains 10, bytes 7-10 are the displacement field 2262A, and it works the same as the legacy 32-bit displacement (disp32) and works at byte granularity.

Displacement factor field 2262B (Byte 7)—when MOD field 2342 contains 01, byte 7 is the displacement factor field 2262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2262B is a reinterpretation of disp8; when using displacement factor field 2262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2262B substitutes the legacy x86 instruction set 8-bit displacement. Thus, the displacement factor field 2262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2272 operates as previously described.

FIG. 9B is a block diagram illustrating the fields of the specific vector friendly instruction format 2300 that make up the full opcode field 2274 according to one embodiment of the invention. Specifically, the full opcode field 2274 includes the format field 2240, the base operation field 2242, and the data element width (W) field 2264. The base operation field 2242 includes the prefix encoding field 2325, the opcode map field 2315, and the real opcode field 2330.

FIG. 9C is a block diagram illustrating the fields of the specific vector friendly instruction format 2300 that make up the register index field 2244 according to one embodiment of the invention. Specifically, the register index field 2244 includes the REX field 2305, the REX' field 2310, the MODR/M.reg field 2344, the MODR/M.r/m field 2346, the VVVV field 2320, xxx field 2354, and the bbb field 2356.

Figure 9D:
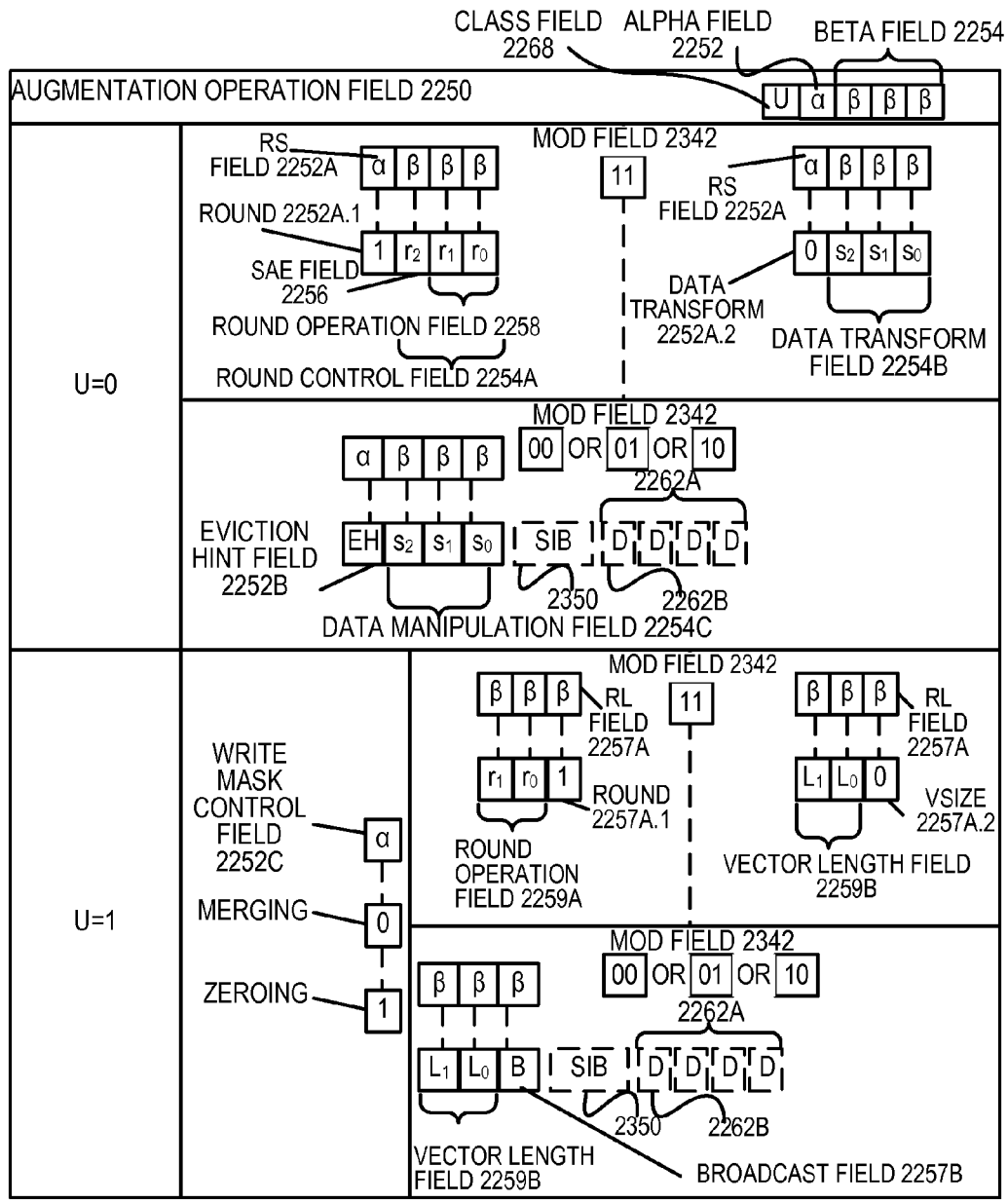
FIG. 9D is a block diagram illustrating a generic vector friendly instruction format according to another embodiment of the invention.

FIG. 9D is a block diagram illustrating the fields of the specific vector friendly instruction format 2300 that make up the augmentation operation field 2250 according to one embodiment of the invention. When the class (U) field 2268 contains 0, it signifies EVEX.U0 (class A 2268A); when it contains 1, it signifies EVEX.U1 (class B 2268B). When U=0 and the MOD field 2342 contains 11 (signifying a no memory access operation), the alpha field 2252 (EVEX byte 3, bit [7]–EH) is interpreted as the rs field 2252A. When the rs field 2252A contains a 1 (round 2252A.1), the beta field 2254 (EVEX byte 3, bits [6:4]–SSS) is interpreted as the round control field 2254A. The round control field 2254A includes a one bit SAE field 2256 and a two bit round operation field 2258. When the rs field 2252A contains a 0 (data transform 2252A.2), the beta field 2254 (EVEX byte 3, bits [6:4]–SSS) is interpreted as a three bit data transform field 2254B. When U=0 and the MOD field 2342 contains 00, 01, or 10 (signifying a memory access operation), the alpha field 2252 (EVEX byte 3, bit [7]–EH) is interpreted as the eviction hint (EH) field 2252B and the beta field 2254 (EVEX byte 3, bits [6:4]–SSS) is interpreted as a three bit data manipulation field 2254C.

When U=1, the alpha field 2252 (EVEX byte 3, bit [7]–EH) is interpreted as the write mask control (Z) field 2252C. When U=1 and the MOD field 2342 contains 11 (signifying a no memory access operation), part of the beta field 2254 (EVEX byte 3, bit [4]–$S_0$) is interpreted as the RL field 2257A; when it contains a 1 (round 2257A.1) the rest of the beta field 2254 (EVEX byte 3, bit [6-5]–$S_{2-1}$) is interpreted as the round operation field 2259A, while when the RL field 2257A contains a 0 (VSIZE 2257.A2) the rest of the beta field 2254 (EVEX byte 3, bit [6-5]–$S_{2-1}$) is interpreted as the vector length field 2259B (EVEX byte 3, bit [6-5]–$L_{1-0}$). When U=1 and the MOD field 2342 contains 00, 01, or 10 (signifying a memory access operation), the beta field 2254 (EVEX byte 3, bits [6:4]–SSS) is interpreted as the vector length field 2259B (EVEX byte 3, bit [6-5]–$L_{1-0}$) and the broadcast field 2257B (EVEX byte 3, bit [4]–B).

FIG. 10 is a block diagram of a register architecture 2400 according to one embodiment of the invention. In the embodiment illustrated, there are 32 vector registers 2410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2300 operates on these overlaid register file as illustrated in the below tables.

| Adjustable Vector Length | Class | Operations | Registers |
|---|---|---|---|
| Instruction Templates that do not include the vector length field 2259B | A (FIG. 8A; U = 0) | 2210, 2215, 2225, 2230 | zmm registers (the vector length is 64 byte) |
| | B (FIG. 8B; U = 1) | 2212 | zmm registers (the vector length is 64 byte) |
| Instruction Templates that do include the vector length field 2259B | B (FIG. 8B; U = 1) | 2217, 2227 | zmm, ymm, or xmm registers (the vector length is 64 byte, 32 byte, or 16 byte) depending on the vector length field 2259B |

In other words, the vector length field 2259B selects between a maximum length and one or more other shorter lengths, where each such shorter length is half the length of the preceding length; and instructions templates without the vector length field 2259B operate on the maximum vector length. Further, in one embodiment, the class B instruction templates of the specific vector friendly instruction format 2300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2415—in the embodiment illustrated, there are 8 write mask registers (k0 through k7), each 64 bits in size. In an alternate embodiment, the write mask registers 2415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 2425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2445, on which is aliased the MMX packed integer flat register file 2450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 2500 includes a fetch stage 2502, a length decode stage 2504, a decode stage 2506, an allocation stage 2508, a renaming stage 2510, a scheduling (also known as a dispatch or issue) stage 2512, a register read/memory read stage 2514, an execute stage 2516, a write back/memory write stage 2518, an exception handling stage 2522, and a commit stage 2524.

FIG. 11B shows processor core 2590 including a front end unit 2530 coupled to an execution engine unit 2550, and both are coupled to a memory unit 2570. The core 2590 may be a reduced instruction set computing (RISC) core, a complex instruction set computing (CISC) core, a very long instruction word (VLIW) core, or a hybrid or alternative core type. As yet another option, the core 2590 may be a special-purpose core, such as, for example, a network or communication core, compression engine, coprocessor core, general purpose computing graphics processing unit (GPGPU) core, graphics core, or the like.

The front end unit 2530 includes a branch prediction unit 2532 coupled to an instruction cache unit 2534, which is coupled to an instruction translation lookaside buffer (TLB) 2536, which is coupled to an instruction fetch unit 2538, which is coupled to a decode unit 2540. The decode unit 2540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2590 includes a microcode ROM or other medium that stores microcode for certain macroinstructions (e.g., in decode unit 2540 or otherwise within the front end unit 2530). The decode unit 2540 is coupled to a rename/allocator unit 2552 in the execution engine unit 2550.

The execution engine unit 2550 includes the rename/allocator unit 2552 coupled to a retirement unit 2554 and a set of one or more scheduler unit(s) 2556. The scheduler unit(s) 2556 represents any number of different schedulers, including reservations stations, central instruction window, etc. The scheduler unit(s) 2556 is coupled to the physical register file(s) unit(s) 2558. Each of the physical register file(s) units 2558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc.

In one embodiment, the physical register file(s) unit 2558 comprises a vector registers unit, a write mask registers unit, and a scalar registers unit. These register units may provide architectural vector registers, vector mask registers, and general purpose registers. The physical register file(s) unit(s) 2558 is overlapped by the retirement unit 2554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2554 and the physical register file(s) unit(s) 2558 are coupled to the execution cluster(s) 2560.

The execution cluster(s) 2560 includes a set of one or more execution units 2562 and a set of one or more memory access units 2564. The execution units 2562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 2556, physical register file(s) unit(s) 2558, and execution cluster(s) 2560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2564). It should also be understood that where separate pipelines are used, one or more of these pipelines may be out-of-order issue/execution and the rest in-order.

The set of memory access units 2564 is coupled to the memory unit 2570, which includes a data TLB unit 2572 coupled to a data cache unit 2574 coupled to a level 2 (L2) cache unit 2576. In one exemplary embodiment, the memory access units 2564 may include a load unit, a store address unit, and a store data unit, each of which is coupled to the data TLB unit 2572 in the memory unit 2570. The instruction cache unit 2534 is further coupled to a level 2 (L2) cache unit 2576 in the memory unit 2570. The L2 cache unit 2576 is coupled to one or more other levels of cache and eventually to a main memory.

By way of example, the exemplary register renaming, out-of-order issue/execution core architecture may implement the pipeline 2500 as follows: 1) the instruction fetch 2538 performs the fetch and length decoding stages 2502 and 2504; 2) the decode unit 2540 performs the decode stage 2506; 3) the rename/allocator unit 2552 performs the allocation stage 2508 and renaming stage 2510; 4) the scheduler unit(s) 2556 performs the schedule stage 2512; 5) the physical register file(s) unit(s) 2558 and the memory unit 2570 perform the register read/memory read stage 2514; the execution cluster 2560 perform the execute stage 2516; 6) the memory unit 2570 and the physical register file(s) unit(s) 2558 perform the write back/memory write stage 2518; 7) various units may be involved in the exception handling stage 2522; and 8) the retirement unit 2554 and the physical register file(s) unit(s) 2558 perform the commit stage 2524.

The core 2590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2590 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2534/2574 and a shared L2 cache unit 2576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12B:
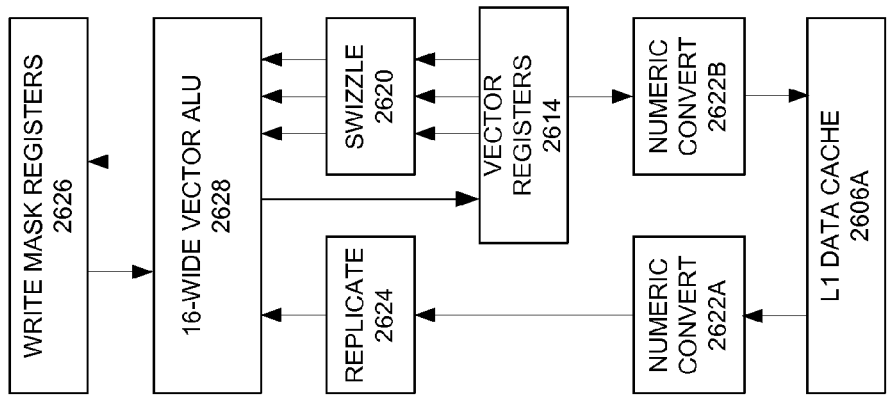
FIG. 12B is a block diagram of a processor core according to another embodiment of the invention.
Figure 12A:
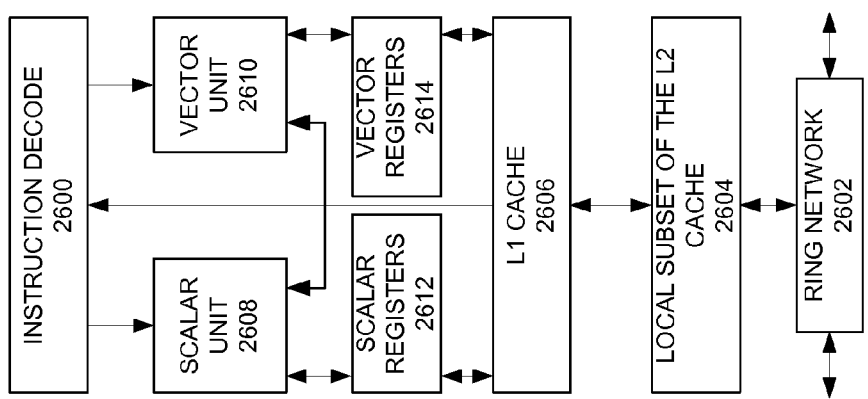
FIG. 12A is a block diagram of a processor core according to one embodiment of the invention.

FIG. 12A and FIG. 12B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 2602 and with its local subset of the Level 2 (L2) cache 2604, according to embodiments of the invention. In one embodiment, an instruction decoder 2600 supports the x86 instruction set with a packed data instruction set extension. An L1 cache 2606 allows low-latency accesses to cache memory into the scalar and vector units. While in one embodiment (to simplify the design), a scalar unit 2608 and a vector unit 2610 use separate register sets (respectively, scalar registers 2612 and vector registers 2614) and data transferred between them is written to memory and then read back in from a level 1 (L1) cache 2606, alternative embodiments of the invention may use a different approach (e.g., use a single register set or include a communication path that allow data to be transferred between the two register files without being written and read back).

The local subset of the L2 cache 2604 is part of a global L2 cache that is divided into separate local subsets, one per processor core. Each processor core has a direct access path to its own local subset of the L2 cache 2604. Data read by a processor core is stored in its L2 cache subset 2604 and can be accessed quickly, in parallel with other processor cores accessing their own local L2 cache subsets. Data written by a processor core is stored in its own L2 cache subset 2604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 2606A part of the L1 cache 2604, as well as more detail regarding the vector unit 2610 and the vector registers 2614. Specifically, the vector unit 2610 is a 16-wide vector processing unit (VPU) (see the 16-wide ALU 2628), which executes one or more of integer, single-precision float, and double-precision float instructions. The VPU supports swizzling the register inputs with swizzle unit 2620, numeric conversion with numeric convert units 2622A-B, and replication with replication unit 2624 on the memory input. Write mask registers 2626 allow predicating resulting vector writes.

Figure 13:
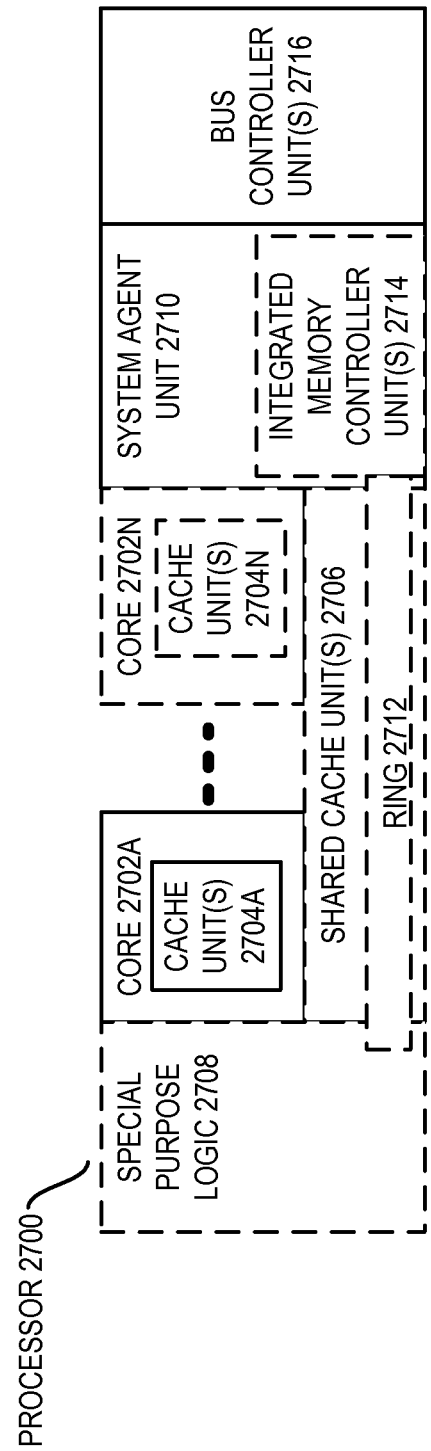
FIG. 13 is a block diagram of a processor according to embodiments of the invention.

FIG. 13 is a block diagram of a processor 2700 that may have more than one core, may have an integrated memory controller, and may have integrated graphics according to embodiments of the invention. The solid lined boxes in FIG. 13 illustrate a processor 2700 with a single core 2702A, a system agent 2710, a set of one or more bus controller units 2716, while the optional addition of the dashed lined boxes illustrates an alternative processor 2700 with multiple cores 2702A-N, a set of one or more integrated memory controller unit(s) 2714 in the system agent unit 2710, and special purpose logic 2708.

Thus, different implementations of the processor 2700 may include: 1) a CPU with the special purpose logic 2708 being integrated graphics and/or scientific (throughput) logic (which may include one or more cores), and the cores 2702A-N being one or more general purpose cores (e.g., general purpose in-order cores, general purpose out-of-order cores, a combination of the two); 2) a coprocessor with the cores 2702A-N being a large number of special purpose cores intended primarily for graphics and/or scientific (throughput); and 3) a coprocessor with the cores 2702A-N being a large number of general purpose in-order cores. Thus, the processor 2700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2706, and external memory (not shown) coupled to the set of integrated memory controller units 2714. The set of shared cache units 2706 may include one or more mid-level caches, such as level 2 (L2), level 3 (L3), level 4 (L4), or other levels of cache, a last level cache (LLC), and/or combinations thereof. While in one embodiment a ring based interconnect unit 2712 interconnects the integrated graphics logic 2708, the set of shared cache units 2706, and the system agent unit 2710/integrated memory controller unit(s) 2714, alternative embodiments may use any number of well-known techniques for interconnecting such units. In one embodiment, coherency is maintained between one or more cache units 2706 and cores 2702-A-N.

In some embodiments, one or more of the cores 2702A-N are capable of multi-threading. The system agent 2710 includes those components coordinating and operating cores 2702A-N. The system agent unit 2710 may include for example a power control unit (PCU) and a display unit. The PCU may be or include logic and components needed for regulating the power state of the cores 2702A-N and the integrated graphics logic 2708. The display unit is for driving one or more externally connected displays.

The cores 2702A-N may be homogenous or heterogeneous in terms of architecture instruction set; that is, two or more of the cores 2702A-N may be capable of execution the same instruction set, while others may be capable of executing only a subset of that instruction set or a different instruction set.

FIG. 14 to FIG. 18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
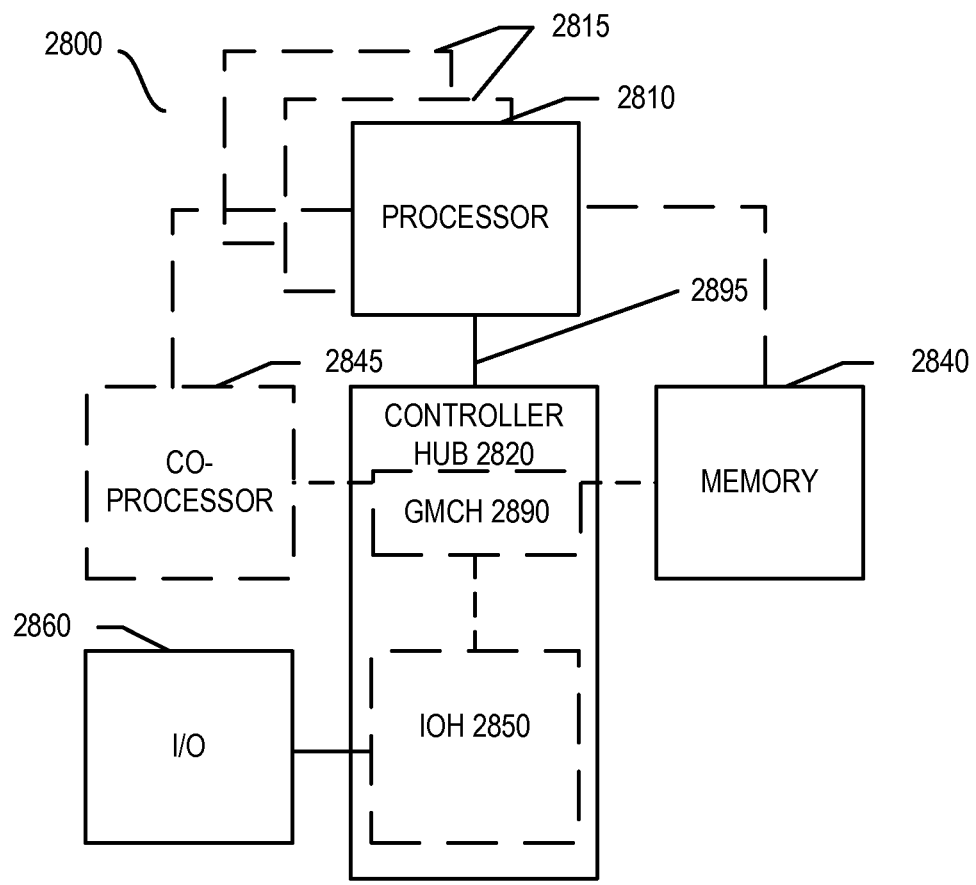
FIG. 14 is a block diagram of a system in accordance with one embodiment of the invention.

Referring now to FIG. 14, shown is a block diagram of a system 2800 in accordance with one embodiment of the present invention. The system 2800 may include one or more processors 2810, 2815, which are coupled to a controller hub 2820. In one embodiment the controller hub 2820 includes a graphics memory controller hub (GMCH) 2890 and an Input/Output Hub (IOH) 2850 (which may be on separate chips); the GMCH 2890 includes memory and graphics controllers to which are coupled memory 2840 and a coprocessor 2845; the IOH 2850 is couples input/output (I/O) devices 2860 to the GMCH 2890. Alternatively, one or both of the memory and graphics controllers are integrated within the processor (as described herein), the memory 2840 and the coprocessor 2845 are coupled directly to the processor 2810, and the controller hub 2820 in a single chip with the IOH 2850.

The optional nature of additional processors 2815 is denoted in FIG. 14 with broken lines. Each processor 2810, 2815 may include one or more of the processing cores described herein and may be some version of the processor 2700.

The memory 2840 may be, for example, dynamic random access memory (DRAM), phase change memory (PCM), or a combination of the two. For at least one embodiment, the controller hub 2820 communicates with the processor(s) 2810, 2815 via a multi-drop bus, such as a frontside bus (FSB), point-to-point interface such as QuickPath Interconnect (QPI), or similar connection 2895.

In one embodiment, the coprocessor 2845 is a special-purpose processor, such as, for example, a high-throughput MIC processor, a network or communication processor, compression engine, graphics processor, GPGPU, embedded processor, or the like. In one embodiment, controller hub 2820 may include an integrated graphics accelerator.

There can be a variety of differences between the physical resources 2810, 2815 in terms of a spectrum of metrics of merit including architectural, microarchitectural, thermal, power consumption characteristics, and the like.

In one embodiment, the processor 2810 executes instructions that control data processing operations of a general type. Embedded within the instructions may be coprocessor instructions. The processor 2810 recognizes these coprocessor instructions as being of a type that should be executed by the attached coprocessor 2845. Accordingly, the processor 2810 issues these coprocessor instructions (or control signals representing coprocessor instructions) on a coprocessor bus or other interconnect, to coprocessor 2845. Coprocessor(s) 2845 accept and execute the received coprocessor instructions.

Figure 15:
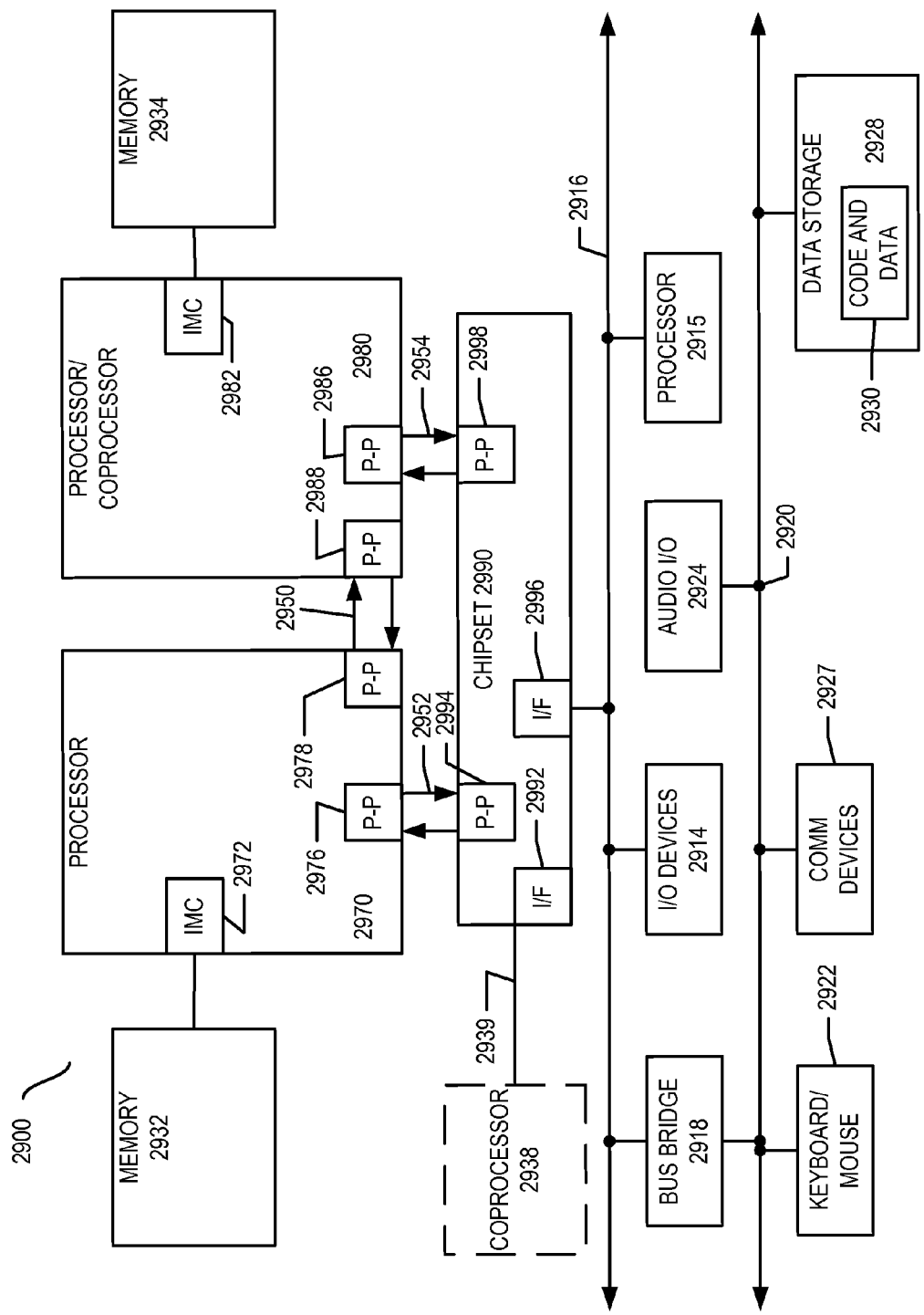
FIG. 15 is a block diagram of a more specific exemplary system in accordance with an embodiment of the invention.

Referring now to FIG. 15, shown is a block diagram of a first more specific exemplary system 2900 in accordance with an embodiment of the present invention. As shown in FIG. 15, multiprocessor system 2900 is a point-to-point interconnect system, and includes a first processor 2970 and a second processor 2980 coupled via a point-to-point interconnect 2950. Each of processors 2970 and 2980 may be some version of the processor 2700. In one embodiment of the invention, processors 2970 and 2980 are respectively processors 2810 and 2815, while coprocessor 2938 is coprocessor 2845. In another embodiment, processors 2970 and 2980 are respectively processor 2810 coprocessor 2845.

Processors 2970 and 2980 are shown including integrated memory controller (IMC) units 2972 and 2982, respectively. Processor 2970 also includes as part of its bus controller units point-to-point (P-P) interfaces 2976 and 2978; similarly, second processor 2980 includes P-P interfaces 2986 and 2988. Processors 2970, 2980 may exchange information via a point-to-point (P-P) interface 2950 using P-P interface circuits 2978, 2988. As shown in FIG. 15, IMCs 2972 and 2982 couple the processors to respective memories, namely a memory 2932 and a memory 2934, which may be portions of main memory locally attached to the respective processors.

Processors 2970, 2980 may each exchange information with a chipset 2990 via individual P-P interfaces 2952, 2954 using point to point interface circuits 2976, 2994, 2986, 2998. Chipset 2990 may optionally exchange information with the coprocessor 2938 via a high-performance interface 2939. In one embodiment, the coprocessor 2938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode. Chipset 2990 may be coupled to a first bus 2916 via an interface 2996. In one embodiment, first bus 2916 may be a Peripheral Component Interconnect (PCI) bus, or a bus such as a PCI Express bus or another third generation I/O interconnect bus, although the scope of the present invention is not so limited.

As shown in FIG. 15, various I/O devices 2914 may be coupled to first bus 2916, along with a bus bridge 2918 which couples first bus 2916 to a second bus 2920. In one embodiment, one or more additional processor(s) 2915, such as coprocessors, high-throughput MIC processors, GPGPU's, accelerators (such as, e.g., graphics accelerators or digital signal processing (DSP) units), field programmable gate arrays, or any other processor, are coupled to first bus 2916. In one embodiment, second bus 2920 may be a low pin count (LPC) bus. Various devices may be coupled to a second bus 2920 including, for example, a keyboard and/or mouse 2922, communication devices 2927 and a storage unit 2928 such as a disk drive or other mass storage device which may include instructions/code and data 2930, in one embodiment. Further, an audio I/O 2924 may be coupled to the second bus 2920. Note that other architectures are possible. For example, instead of the point-to-point architecture of FIG. 15, a system may implement a multi-drop bus or other such architecture.

Figure 16:
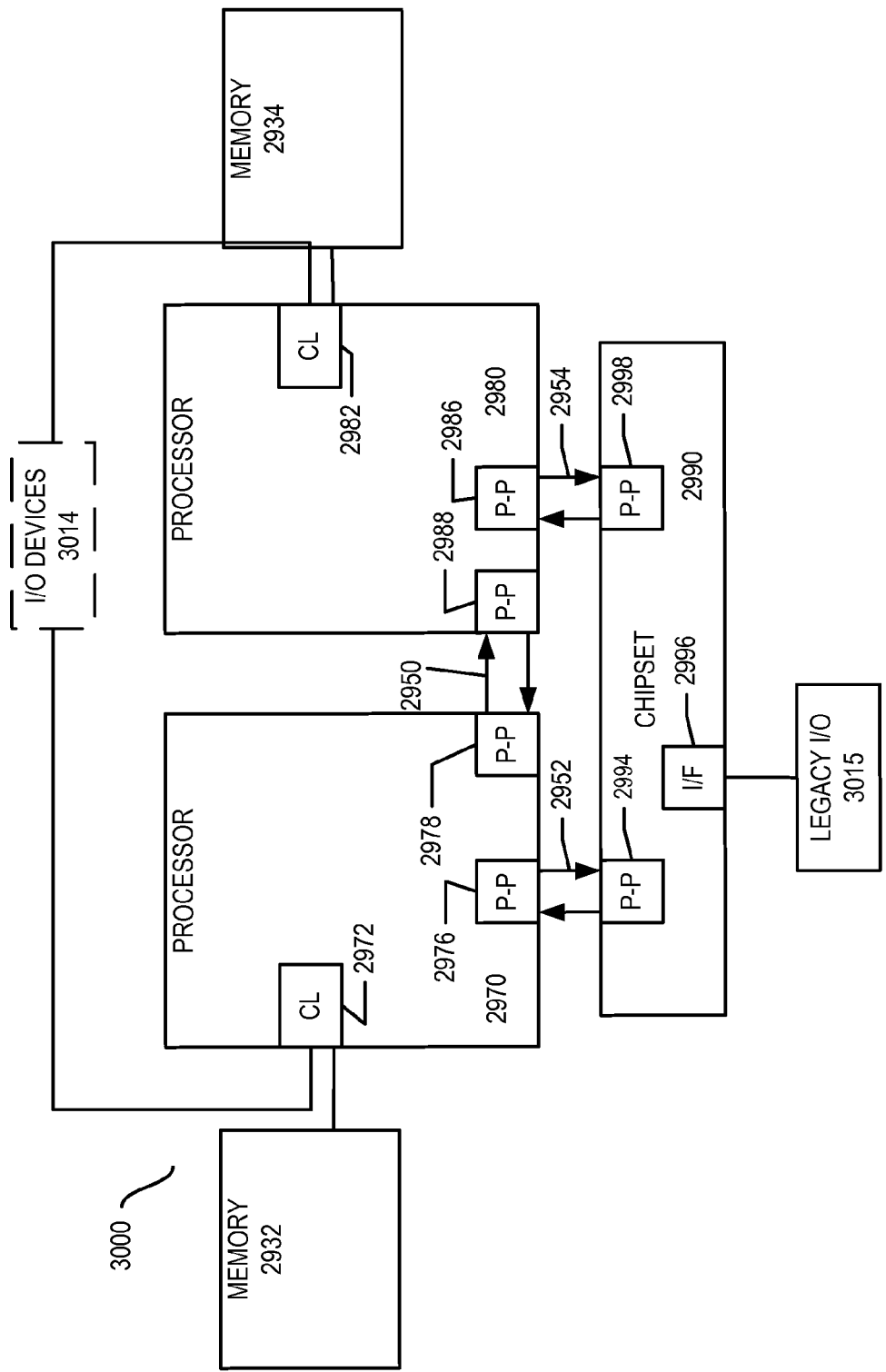
FIG. 16 is a block diagram of a more specific exemplary system in accordance with another embodiment of the invention.

Referring now to FIG. 16, shown is a block diagram of a second more specific exemplary system 3000 in accordance with an embodiment of the present invention. Like elements in FIG. 16 and FIG. 17 bear like reference numerals, and certain aspects of FIG. 15 have been omitted from FIG. 16 in order to avoid obscuring other aspects of FIG. 16. FIG. 16 illustrates that the processors 2970, 2980 may include integrated memory and I/O control logic ("CL") 2972 and 2982, respectively. Thus, the CL 2972, 2982 include integrated memory controller units and include I/O control logic. FIG. 16 illustrates that not only are the memories 2932, 2934 coupled to the CL 2972, 2982, but also that I/O devices 3014 are also coupled to the control logic 2972, 2982. Legacy I/O devices 3015 are coupled to the chipset 2990.

Figure 17:
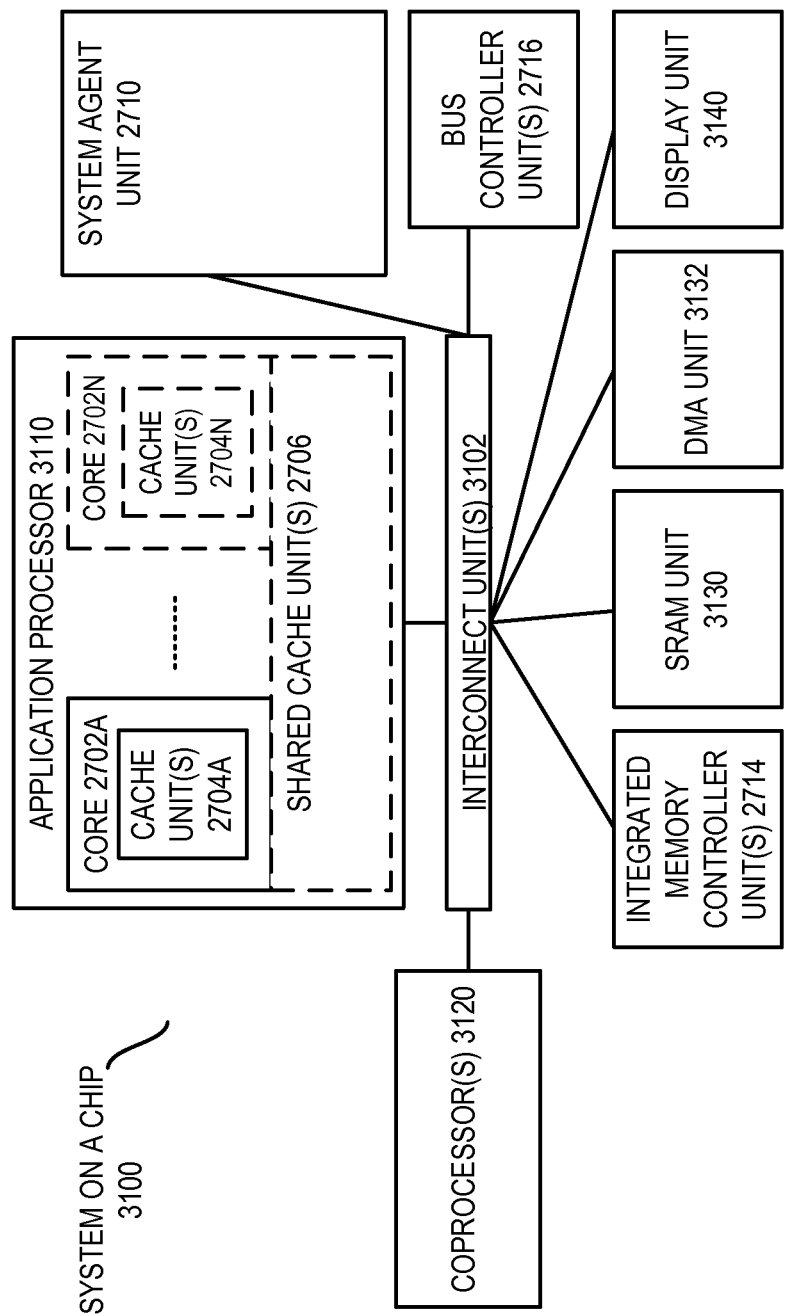
FIG. 17 is a block diagram of a SoC in accordance with an embodiment of the invention.

Referring now to FIG. 17, shown is a block diagram of a SoC 3100 in accordance with an embodiment of the present invention. Similar elements in FIG. 13 bear like reference numerals. Also, dashed lined boxes are optional features on more advanced SoCs. In FIG. 17, an interconnect unit(s) 3102 is coupled to: an application processor 3110 which includes a set of one or more cores 202A-N and shared cache unit(s) 2706; a system agent unit 2710; a bus controller unit(s) 2716; an integrated memory controller unit(s) 2714; a set or one or more coprocessors 3120 which may include integrated graphics logic, an image processor, an audio processor, and a video processor; an static random access memory (SRAM) unit 3130; a direct memory access (DMA) unit 3132; and a display unit 3140 for coupling to one or more external displays. In one embodiment, the coprocessor(s) 3120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2930 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
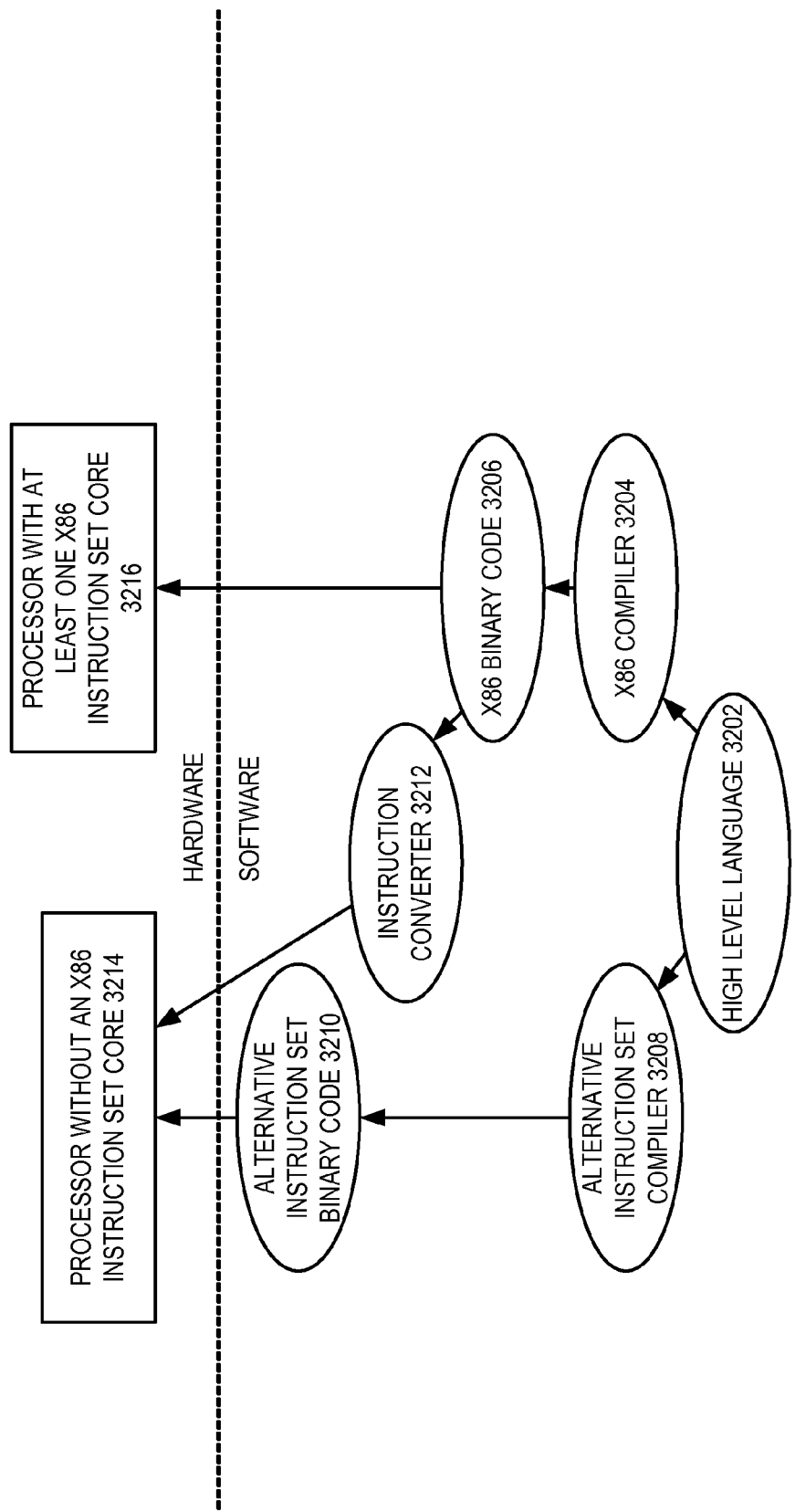
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 3202 may be compiled using an x86 compiler 3204 to generate x86 binary code 3206 that may be natively executed by a processor with at least one x86 instruction set core 3216. The processor with at least one x86 instruction set core 3216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3204 represents a compiler that is operable to generate x86 binary code 3206 (e.g., object code) that can, with or without additional linkage processing, be executed on the processor with at least one x86 instruction set core 3216. Similarly, FIG. 18 shows the program in the high level language 3202 may be compiled using an alternative instruction set compiler 3208 to generate alternative instruction set binary code 3210 that may be natively executed by a processor without at least one x86 instruction set core 3214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3212 is used to convert the x86 binary code 3206 into code that may be natively executed by the processor without an x86 instruction set core 3214. This converted code is not likely to be the same as the alternative instruction set binary code 3210 because an instruction converter capable of this is difficult to make; however, the converted code will accomplish the general operation and be made up of instructions from the alternative instruction set. Thus, the instruction converter 3212 represents software, firmware, hardware, or a combination thereof that, through emulation, simulation or any other process, allows a processor or other electronic device that does not have an x86 instruction set processor or core to execute the x86 binary code 3206.

According to one embodiment, a processor includes an instruction decoder to receive an instruction having a first operand, a second operand, and a third operand; and an execution unit coupled to the instruction decoder to execute the instruction, the execution unit to individually perform a shift operation by one bit for each of a plurality of data elements stored in a storage location indicated by the second operand, for each of the data elements that has an overflow in response to the shift-left operation, to carry over the overflow into an adjacent data element based on a first bitmask obtained from the third operand, generating a final result, and to store the final result in a storage location indicated by the first operand. The first bitmask includes a plurality of bits, each corresponding to one of the data elements, and wherein an overflow of a data element is carried over to an adjacent data element only if a corresponding bit of the first bitmask has a predetermined logical value. The instruction further includes a fourth operand specifying a second bitmask, wherein the shift operation is performed on data elements based on the second bitmask. The second bitmask includes a plurality of bits, each corresponding to one of the data elements, and wherein a shift operation is performed on a data element only if a corresponding bit of the second bitmask has a predetermined logical value. The shift operation is a shift-left operation. A most significant bit (MSB) of a data element having an overflow is carried over to a least significant bit (LSB) of an adjacent data element. The shift operation is a shift-right operation. A least significant bit (LSB) of a data element having an overflow is carried over to a most significant bit (MSB) of an adjacent data element.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
   an instruction decoder to decode an instruction having a first operand, a second operand, and a third operand; and
   an execution circuit coupled to the instruction decoder to execute the decoded instruction, the execution circuit to individually perform a shift operation by at least one bit for each of a plurality of data elements stored in a storage location indicated by the second operand, for each of the data elements that has an overflow in response to the shift operation, to carry over the overflow into an adjacent data element based on a first bitmask obtained from the third operand, to generate a final result, and to store the final result in a storage location indicated by the first operand.

2. The processor of claim 1, wherein the first bitmask to include a plurality of bits, each corresponding to one of the data elements, and wherein an overflow of a data element is carried over to an adjacent data element only if a corresponding bit of the first bitmask has a predetermined logical value.

3. The processor of claim 1, wherein the instruction to further include a fourth operand to specify a second bitmask, wherein the shift operation is performed on data elements based on the second bitmask.

4. The processor of claim 3, wherein the second bitmask to include a plurality of bits, each of the plurality of bits corresponding to one of the data elements, and wherein a shift operation is performed on a data element only if a corresponding bit of the second bitmask has a predetermined logical value.

5. The processor of claim 1, wherein the shift operation is a shift-right operation.

6. The processor of claim 5, wherein at least one least significant bit (LSB) of a data element having an overflow is carried over to at least one most significant bit (MSB) of an adjacent data element.

7. A method, comprising:
   decoding, at an instruction decoder of a processor, an instruction having a first operand, a second operand, and a third operand; and
   executing, by an execution unit of the processor, the decoded instruction to individually perform a shift operation by at least one bit for each of a plurality of data elements stored in a storage location indicated by the second operand, for each of the data elements that has an overflow in response to the shift operation, carrying over the overflow into an adjacent data element based on a first bitmask obtained from the third operand, generating a final result, and storing the final result in a storage location indicated by the first operand.

8. The method of claim 7, wherein the first bitmask includes a plurality of bits, each corresponding to one of the data elements, and wherein an overflow of a data element is carried over to an adjacent data element only if a corresponding bit of the first bitmask has a predetermined logical value.

9. The method of claim 7, wherein the instruction further includes a fourth operand specifying a second bitmask, wherein the shift operation is performed on data elements based on the second bitmask.

10. The method of claim 9, wherein the second bitmask includes a plurality of bits, each corresponding to one of the data elements, and wherein a shift operation is performed on a data element only if a corresponding bit of the second bitmask has a predetermined logical value.

11. The method of claim 7, wherein the shift operation is a shift-right operation.

12. The method of claim 11, wherein at least one most significant bit (MSB) of a data element having an overflow is carried over to at least one least significant bit (LSB) of an adjacent data element.

13. A system, comprising:
   an interconnect;
   a dynamic random access memory (DRAM) coupled to the interconnect; and
   a processor coupled the interconnect, including
      an instruction decoder to decode an instruction having a first operand, a second operand, and a third operand, and
      an execution circuit coupled to the instruction decoder to execute the decoded instruction, the execution circuit to individually perform a shift operation by at least one bit for each of a plurality of data elements stored in a storage location indicated by the second operand, for each of the data elements that has an overflow in response to the shift operation, to carry over the overflow into an adjacent data element based on a first bitmask obtained from the third operand, to generate a final result, and to store the final result in a storage location indicated by the first operand.

14. The system of claim 13, wherein the first bitmask to include a plurality of bits, each corresponding to one of the data elements, and wherein an overflow of a data element is carried over to an adjacent data element only if a corresponding bit of the first bitmask has a predetermined logical value.

15. The system of claim 13, wherein the instruction to further include a fourth operand to specify a second bitmask, wherein the shift operation is performed on data elements based on the second bitmask.

16. The system of claim 15, wherein the second bitmask to include a plurality of bits, each of the plurality of bits corresponding to one of the data elements, and wherein a shift operation is performed on a data element only if a corresponding bit of the second bitmask has a predetermined logical value.

17. The system of claim 13, wherein the shift operation is a shift-right operation.

18. The system of claim 17, wherein at least one least significant bit (LSB) of a data element having an overflow is carried over to at least one most significant bit (MSB) of an adjacent data element.

* * * * *